(12) United States Patent
Doyle et al.

(10) Patent No.: US 7,599,985 B2
(45) Date of Patent: *Oct. 6, 2009

(54) DISTRIBUTED HYPERMEDIA METHOD AND SYSTEM FOR AUTOMATICALLY INVOKING EXTERNAL APPLICATION PROVIDING INTERACTION AND DISPLAY OF EMBEDDED OBJECTS WITHIN A HYPERMEDIA DOCUMENT

(75) Inventors: Michael Doyle, Alameda, CA (US); David Martin, San Jose, CA (US); Cheong Ang, Pacifica, CA (US)

(73) Assignee: Regents of the University of California, Oakland, CA (US)

( * ) Notice: Subject to any disclaimer, the term of this patent is extended or adjusted under 35 U.S.C. 154(b) by 1428 days.

This patent is subject to a terminal disclaimer.

(21) Appl. No.: 10/217,955

(22) Filed: Aug. 9, 2002

(65) Prior Publication Data

US 2003/0154261 A1 Aug. 14, 2003

Related U.S. Application Data

(63) Continuation of application No. 09/075,359, filed on May 8, 1998, now abandoned, which is a continuation of application No. 08/324,443, filed on Oct. 17, 1994, now Pat. No. 5,838,906.

(51) Int. Cl.
*G06F 9/46* (2006.01)
*G06F 17/30* (2006.01)
*G06F 9/50* (2006.01)

(52) U.S. Cl. .................. 709/202; 709/218; 709/219; 715/205; 715/738; 715/760; 715/777; 715/804; 719/310; 719/315; 718/106; 345/419; 345/427; 345/619; 345/638; 345/649; 345/653; 345/654; 345/655; 345/656; 707/E17.119

(58) Field of Classification Search ......... 709/202–205, 709/217–219; 345/738, 744–749, 760, 804, 345/419, 427, 619, 638, 649, 653–656; 719/328–330, 719/310, 315; 715/501.1, 513, 515–516, 715/205, 738, 760, 777, 804; 718/106; 707/E17.119
See application file for complete search history.

(56) References Cited

U.S. PATENT DOCUMENTS 4,815,029 A 3/1989 Barker et al.

(Continued)

OTHER PUBLICATIONS

Toye, G., et al., SHARE : A Methodology and Environment for Collaborative Product Development, Proceedings, Second Workshop on Enabling Technologies: Infrastructure for Collaborative Enterprises, 1993, IEEE, pp. 33-47, Apr. 22, 1993.*

(Continued)

*Primary Examiner*—Larry D Donaghue
(74) *Attorney, Agent, or Firm*—Charles E. Krueger

(57) ABSTRACT

A system allowing a user of a browser program on a computer connected to an open distributed hypermedia system to access and execute an embedded program object. The program object is embedded into a hypermedia document much like data objects. The user may select the program object from the screen. Once selected the program object executes on the user's (client) computer or may execute on a remote server or additional remote computers in a distributed processing arrangement. After launching the program object, the user is able to interact with the object as the invention provides for ongoing interprocess communication between the application object (program) and the browser program. One application of the embedded program object allows a user to view large and complex multi-dimensional objects from within the browser's window. The user can manipulate a control panel to change the viewpoint used to view the image. The invention allows a program to execute on a remote server or other computers to calculate the viewing transformations and send frame data to the client computer thus providing the user of the client computer with interactive features and allowing the user to have access to greater computing power than may be available at the user's client computer.

47 Claims, 9 Drawing Sheets

U.S. PATENT DOCUMENTS

| | | | |
|---|---|---|---|
| 4,847,604 | A | 7/1989 | Doyle |
| 4,949,248 | A | 8/1990 | Caro |
| 5,056,057 | A | 10/1991 | Johnson et al. |
| 5,146,553 | A | 9/1992 | Noguchi et al. |
| 5,202,828 | A | 4/1993 | Vertelney et al. |
| 5,204,947 | A | 4/1993 | Bernstein et al. |
| 5,206,951 | A | 4/1993 | Khoyi et al. |
| 5,274,821 | A | 12/1993 | Rouquie |
| 5,307,499 | A | 4/1994 | Yin |
| 5,321,806 | A | 6/1994 | Meinerth et al. |
| 5,321,807 | A | 6/1994 | Mumford |
| 5,321,808 | A | 6/1994 | Rupp et al. |
| 5,339,392 | A | 8/1994 | Risberg et al. |
| 5,347,632 | A | 9/1994 | Filepp et al. |
| 5,367,635 | A | 11/1994 | Bauer et al. |
| 5,390,314 | A | 2/1995 | Swanson |
| 5,418,908 | A | 5/1995 | Keller et al. |
| 5,425,141 | A * | 6/1995 | Gedye ........................ 345/797 |
| 5,499,369 | A | 3/1996 | Atkinson |
| 5,537,526 | A * | 7/1996 | Anderson et al. ........... 715/515 |
| 5,544,320 | A | 8/1996 | Konrad |
| 5,581,506 | A | 12/1996 | Yamauchi |
| 5,581,686 | A | 12/1996 | Koppolu et al. |
| 5,606,493 | A | 2/1997 | Duscher et al. |
| 5,613,058 | A | 3/1997 | Koppolu et al. |
| 5,634,019 | A | 5/1997 | Koppolu et al. |
| 5,652,876 | A | 7/1997 | Ashe et al. |
| 5,754,175 | A | 5/1998 | Koppolu et al. |
| 5,801,701 | A | 9/1998 | Koppolu et al. |
| 5,812,862 | A * | 9/1998 | Smith et al. ................. 715/515 |
| 5,838,906 | A | 11/1998 | Doyle et al. |
| 6,055,514 | A | 4/2000 | Wren |

OTHER PUBLICATIONS

Lin, J., MediaMosaic—A Multimedia Editing Environment, Proc. of the 5th Annual ACM Symposium on User Interface Software and Technology, ACM Press, pp. 135-141, 1992.*
Halasz, F., Reflections on NoteCards: Seven Issues for the Next Generation of Hypermedia Systems, ACM Journal on Computer Documentation, vol. 25, No. 3, pp. 71-87, Aug. 2001, reprinting article published in 1988.*
Feiner, S., et al., An Experimental System for Creating and Presenting Interactive Graphical Documents, ACM Transactions on Graphics, vol. 1, No. 1, pp. 59-77, Jan. 1982.*
Garg, P., et al., A Hypertext System to Manage Life Cycle Documents, Proc. of the 25th Annual Hawaii Int'l Conf. on System Sciences, 1988, IEEE, vol. 2, pp. 337-346, Jan. 1988.*
Adie, C., Network Access to Multimedia Information, 2nd ed., RARE Project OBR(93)015, RARE, pp. 1-53, Feb. 4, 1994.*
Reichard, K., et al., X11R6: the Rumored Changes (Release 6 of the X Window System), Unix Review, vol. 11, No. 5, p. 101(5 pp. 1-4 as printed, May 1993.*
Cox, B., Object Oriented Programming: An Evolutionary Approach, Addison-Wesley, pp. 1-12, 1987.*
Solaris OpenWindows: Introduction to the ToolTalk Service—A White Paper, Sun Microsystems, Inc., pp. 1-16, 1991.*
Tool Inter-Operability: A Hands On Demonstration—A Simple Demonstration of How the ToolTalk Service Works, Sun Microsystems, Inc., pp. 1-24, 1992.*
Designing and Writing a ToolTalk Procedural Protocol—A White Paper, Sun Microsystems, Inc., pp. 1-24, 1992.*
Fresco Frequently Asked Questions, www.i.h.kyoto-u.ac.jp/—shom/doc.org/fresco/FAQ.html, pp. 1-4, Apr. 13, 1995.*
The Andrew View, Carnegie Mellon Univ., www-2.cs.cmu.edu/People/AUIS/ftp/NEWSLETTERS/ASCII/93Jun.ascii, vol. 2, No. pp. 1-12 as printed, Jun. 1993.*
The X Window System And Broadway, www.broadwayinfo.com/bwwhitesbroadwayhct.htm, Hummingbird Communications Ltd pp. 1-11, 1997.*
Neuendorffer, T., ADEW: A Multimedia Interface Builder for Andrew, Proceedings Multi-Media Communications, Applications, and Technology Workshop, pp. 1-19, Jul. 1991.*
Palay, A., Andrew Toolkit: An Overview, Tech Rept., Carnegie-Mellon University Information Technology Center, pp. 1-15, 198.*
Dettmer, R., X-Windows—the great integrator, IEE Review, vol. 36, No. 6, pp. 219-222, Jun. 1990.*
Engelbart, D., Knowledge-Domain Interoperability and an Open Hyperdocument System, Proc. of the 1990 ACM Conference on Computer-Supported Cooperative Work, ACM Press, pp. 143-156, 1990.*
Meyrowitz, N., Intermedia: The Architecture and Construction of an Object-Oriented Hypermedia System and Applications Framework, Proc. of the Conf. on Object Oriented Programming Systems, Languages, and Applications, ACM Press, pp. 186- 201, 1986.*
Wiil, U., Issues in the Design of EHTS: A Multiuser Hypertext System for Collaboration, Proc. of the 25th Hawaii Int'l. Conf. on Systems Sciences, vol. 2, pp. 629-639, Jan. 1992.*
Celentano, A., et al., A Multiple Presentation Document Management System, Proc. of the 10th Annual Int'l. Conf. on Systems Documentation, ACM Press, pp. 63-71, 1992.*
Garg, P., et al., A Hypertext System to Manage Life Cycle Documents, Proc. of the 25th Annual Hawaii Int'l. Conf. on System Sciences, 1988, IEEE, vol. 2, pp. 337-346, Jan. 1988.*
Tani, M., et al., "Object-Oriented Video: Interaction with Real-World Objects Through Live Video," May 2002, pp. 593-598.
Crowley, T., et al., "MMCONF: An Infrastructure for Building Shared Multimedia Applications," CSCW 90 Proceedings, Oct. 1990, pp. 329-342.
Davis, H., et al., "Towards an Integrated Information Environment with Open Hypermedia System," ACM ECHT Conference, Dec. 1992, pp. 181-190.
Ferrara, F., "The KIM Query System," Abstract, SIGCHI Bulletin, vol. 6, No. 3, Jul. 1994, pp. 30-39.
Gibbs, S., "Composite Multimedia and Active Objects," OOPSLA '91, pp. 97-112.
Davis, H., et al., "Microcosm: An Open Hypermedia System," Interchi '93, Apr. 1993, p. 526.
Vaziri, A., "Scientific Visualization in High-Speed Network Environments," Computer Networks and ISDN Systems 22, 1991, pp. 111-129.
Cullen, J., et al., "The Use of FTAM to Access Graphical Pictures Across Wide Area Networks," Computer Networks and ISDN Systems, 1992, pp. 337-383.
Lashkari, Y.Z., et al., "PLX: A Proposal to Implement a General Broadcasting Facility in a Distributed Environment Running X Windows," Comput. & Graphics, vol. 16, No. 2, 1992, pp. 143-149.
Coulson, G., et al., "Extensions to ANSA for Multimedia Computing," Computer Networks and ISDN Systems 25, 1992, pp. 305-323.
Kirste, T., "Spacepicture—An Interactive Hypermedia Satellite Image Archival System," Comput. & Graphics, vol. 17, No. 3, 1993, pp. 251-260.
Huynh, Duong Le, et al., "PIX: An Object-Oriented Network Graphics Environment," Comput. & Graphics, vol. 17, No. 3, 1993, pp. 295-304.
Berners-Lee, T.J., et al., "The World-Wide Web," Computer Networks and ISDN Systems, 25, 1992, pp. 454-459.
Shackelford, D.E., et al., "The Architecture and Implementation of a Distributed Hypermedia Storage System," Hypertext '93 Proceedings, Nov. 1993, pp. 1-13.
Labriola, D., "Remote Possibilities," PC Magazine, Jun. 14, 1994, pp. 223-228.
Udell, J., "Visual Basic Custom Controls Meet OLE," Byte Magazine, Mar. 1994, pp. 197-200.
Sarna, D.E., et al., "OLE Gains Without (Much) Pain," Datamation Magazine, Jun. 15, 1994, pp. 31 and 113.
Rizzo, J., "What's OpenDoc?" MacUser Magazine, Apr. 1994, pp. 119-123.
"Cello WWW Browser Release 1.01a," article obtained from the Internet, ftp.law.cornell.edu/pub/L11/Cello no DDE, Mar. 16, 1994, pp. 2-9.
"OLE 2.0: Death to Monoliths," Byte Magazine, Mar. 1994, p. 122.

Vetter, Ronald, "Mosaic and the World-Wide Web," Computer Magazine, vol. 27, Iss. 10, pp. 49-57.
Wynne et al., "Lean Management, Group Support Systems, and Hypermedia: a Combination Whose Time Has Come," System Sciences, 1993 Annual Hawaii Int'l. Conf., pp. 112-121.
Hansen, Wilfred, "Andrew as a Multiparadigm Environment for Visual Languages," Visual Languages, 1993 IEEE Symposium, pp. 256-260.
Moran, Patrick "Tele-Nicer-Slicer-Dicer: A New Tool for the Visualization of Large Volumetric Data," NCSA Technical Report (TR014), Aug. 1993.
Le Hunte, Stephen, "<EEMBED>—Embedded Objects," HTML Reference Library—HTMLib V2.1, 1995: n. pag. Online.Internet.
"A Little History of the World Wide Web," n.pag. Online.Internet: available http://www.w3.org/History.html.
"NCSA Mosaic Version Information," n.pag. Online.Internet: available http://www.ncsa.uiuc.edu/SDG/Software.
"The Second Phase of the Revolution," Wired, Oct. 1994, pp. 116-152.
Berners-Lee, "Hypertext Markup Language (HTML)," HTML Internet Draft, IIIR working group.
University of Southern California's Mercury Project—"USC Mercury Project:Interface: Project Milestones," USC press release, obtained from Internet, http://www.usc.edu/dept/raiders.
Hansen, Wilfred, "Enhancing Documents with Embedded Programs: How Ness Extends Insets in the Andrew ToolKit," IEEE Computer Languages, 1990 International Conference.
Fogarty, K., et al., "Microsoft's OLE Can Be Network Trojan Horse," Network World Magazine, Jun. 27, 1994, vol. 11, No. 26, pp. 1 and 75.
Defendant's Trial Exhibit 37 (includes "viola.TOGO.tar.Z" and other Viola information) [Compact Disc].
Printout of readable contents of Defendant's Trial Exhibit 37.
Defendant's Trial Exhibit 34 (information regarding Viola including Viola 930512.tar.gz.zip) [Compact Disc].
Printout of readable contents of Defendant's Trial Exhibit 34.
PW 1130 (Viola related material similar to Defendant's Trial Exhibit 34 but with a different file structure) [Compact Disc].
MS Supp 1205_001 (Viola related material) [Compact Disc].
MS Supp 1205_002 (Viola related material) [Compact Disc].
MS-ET 0009786 (violaTOGO.tar.Z) [Compact Disc].
MS-ET 9706 (information regarding Viola similar to PW 1130) [Compact Disc].
MS-ET 0153301 (information regarding Viola similar to PW 1130) [Compact Disc].
Defendant's Trial Exhibit 37 File Tree Printout.
PW 1130 File Tree Printout.
Defendant's Trial Exhibit 34 File Tree Printout.
MS Supp 1205_001 File Tree Printout.
MS Supp 1205_002 File Tree Printout.
MS-ET 0009786 File Tree Printout.
MS-ET 9706 File Tree Printout.
MS-ET 0153301 File Tree Printout.
Anonymous, "xresources.h," 15 pages (1993). (Downloaded from "Index of /pub/mosaic/Unix/source/old" as part of the file "xmosaic-1.2.tar.z"; Exhibit E has 15 pages, including printouts for: (1) the web page for downloading "xmosaic-1.2.tar.z," (2) the contents of "xmosaic-1.2.tar.z," and (3) the file "xresources.h" in "xmosaic-1.2.tar.z").
Anonymous, "Default File Extensions in Mosaic 2.0pre4," 1 page.
Anonymous, "Default MIME Types in Mosaic 2.0pre4," 1 page.
Anonymous, "gs.interface," 2 pages (Jul. 1993). (Downloaded from "ftp://mirror.cs.wesc.edu/pub/mirrors/ghost/gnu/ghostview/" as part of the file "ghoastview-1.5.tar.gz.").
Marc Andreessen, "NCSA Mosaic for X 2.0 prerelease 4 available," www-talk email list, 4 pages (Sep. 29, 1993).
John Bradley, "xv, Interactive Image Display for the X Window System," 72 pages (1992). (Downloaded from "Index of /root/usr.local.src/xv-2.21" as part of the file "xv-2.21.tar.z"; Exhibit I has 77 pages, including printouts for: (1) the web page for downloading "xv-2.21.tar.z," (2) the contents of "xv-2.21.tar.z," and (3) the file "xvdocs.ps. z" in "xv-2.21.tar.z.").

John Bradley, "xv, Interactive Image Display for the X Window System," 105 pages (Apr. 26, 1993). (Downloaded from "Index of/pub/net/infosys/NCSA/Web/Mosaic/Unix/view" as part of the file "xv-3.00.tar.z"; Exhibit J has 110 pages, including printouts for: (1) the web page for downloading "xv-3.00.tar.z," (2) the contents of "xv-3.00.tar.z," and (3) the file "xvdocs.ps.z" in "xv-3.00.tar.z.").
Doyle et al., "Processing Cross-sectional Image Data for Reconstruction of Human Developmental Anatomy from Museum Specimens," Newsletter of the Association for Computing Machinery Special Interest Group on Biomedical Computing, vol. 13, No. 1, ACM Press, coverage page, table of contents, pp. 9-15 (Feb. 1993).
Adrian Nye, Xlib Programming Manual for Version 11, O'Reilly & Associates, Inc., title page, copyright page, pp. i-xxxiii, 1-46, and index (1988).
Timothy Thiesen, "Ghostview(1) Unix Programmer's Manual," 14 pages (Jul. 1993). (Downloaded from "ftp://mirror.cs.wesc.edu/pub/mirrors/ghost/gnu/ghostview/" as part of the file "ghostview-1.5.tar.gz"; Exhibit L has 21 pages, including printouts for: (1) the FTP site for downloading "ghostview-1.5.tar.gz," (2) the contents of "ghostview-1.5.tar.gz," and (3) the file "ghostview.ps" in "ghostview-1.5.tar.gz," and (4) the file "README" in "ghostview-1.5.tar.gz.").
Douglas Young, The X Window System, Programming and Applications with Xt, Prentice Hall, title page, copyright page, pp. i-x, 1-13, 123-166, 280-332, 520-533 (1990).
DTX1031-c.pdf (MS_SUPP1205 002 part 1).
DTX1031-hmml.pdf (MS_SUPP1205 002 part 2).
DTX1031-html.pdf (MS_SUPP1205 002 part 3).
DTX1031-images.pdf (MS_SUPP1205 002 part 4).
DTX1031-make.pdf (MS_SUPP1205 002 part 5).
DTX1031-other.pdf (MS_SUPP1205 002 part 6).
DTX1031-shell.pdf (MS_SUPP1205 002 part 7).
DTX1031-v.pdf (MS_SUPP1205 002 part 8).
DTX1031-wais.pdf (MS_SUPP1205 002 part 9).
DTX1030-c1.pdf (MS_SUPP1205 001 part 1).
DTX1030-c2.pdf (MS_SUPP1205 001 part 2).
DTX1030-hmml.pdf (MS_SUPP1205 001 part 3).
DTX1030-html.pdf (MS_SUPP1205 001 part 4).
DTX1030-images.pdf (MS_SUPP1205 001 part 5).
DTX1030-make.pdf (MS_SUPP1205 001 part 6).
DTX1030-other.pdf (MS_SUPP1205 001 part 7).
DTX1030-ps.pdf (MS_SUPP1205 001 part 8).
DTX1030-sgml.pdf (MS_SUPP1205 001 part 9).
DTX1030-shell.pdf (MS_SUPP1205 001 part 10).
DTX1030-v1.pdf (MS_SUPP1205 001 part 11).
DTX1030-v2.pdf (MS_SUPP1205 001 part 12).
DTX1030-wais.pdf (MS_SUPP1205 001 part 13).
Defendant's Trial Exhibit 273: Information Regarding Microsoft OLE 2.01 SDK (CD).
File Tree Printout of Defendant's Trial Exhibit 273: Information Regarding Microsoft OLE 2.01 SDK.
Defendant's Trial Exhibit 258: Information Regarding Microsoft OLE 2.0 Toolkit Program (CD).
File Tree Printout of Defendant's Trial Exhibit 258: Information Regarding Microsoft OLE 2.0 Toolkit Program.
MS-ET 0166172: Information Regarding Microsoft OLE 2.01 SDK (CD).
File Tree Printout of MS-ET 0166172: Information Regarding Microsoft OLE 2.01 SDK.
MS-ET 0189860: First Companion Disk for "Inside OLE 2" by Kraig Brockschmidt (CD).
File Tree Printout of MS-ET 0189860: First Companion Disk for "Inside OLE 2" by Kraig Brockschmidt.
MS-ET 0189861: Second Companion Disk for "Inside OLE 2" by Kraig Brockschmidt (CD).
File Tree Printout of MS-ET 0189861: Second Companion Disk for "Inside OLE 2" by Kraig Brockschmidt.
Defendant's Trial Exhibit 326: Information Regarding Multimedia Viewer (CD).
File Tree Printout of Defendant's Trial Exhibit 326: Information Regarding Multimedia Viewer.
Defendants Trial Exhibit 215: Information Regarding Emacs (CD).

File Tree Printout of Defendants Trial Exhibit 215: Information Regarding Emacs.
E 021700: Information Regarding WebRouser (CD).
File Tree Printout of E 021700: Information Regarding WebRouser.
E 027693: Information Regarding Distributed Hypermedia Object Embedding (DHOE) (CD).
File Tree Printout of E 027693: Information Regarding Distributed Hypermedia Object Embedding (DHOE).
DX258-x.pdf.
DX258-images.pdf.
DX258-ps.pdf.
DX258-text.pdf.
DX258-wais.pdf.
DX326-c.pdf.
DX326-images.pdf.
DX326-text.pdf.
DX273-c.pdf.
DX273-images.pdf.
DX273-text.pdf.
E-027693-c.pdf.
E-027693-make.pdf.
E-027693-text.pdf.
E-021700-c.pdf.
E-021700-html.pdf.
E-021700-images.pdf.
E-021700-make.pdf.
E-021700-ps.pdf.
E-021700-shell.pdf.
E-021700-text.pdf.
DX215-text1.pdf.
DX215-text2.pdf.
DX215-c.pdf.
DX215-images.pdf.
DX215-make.pdf.
DX215-ps.pdf.
DX215-shell.pdf.
DX215-text3.pdf.
Declaration of Interference, *Doyle* v. *Koppolu*, Patent Interference 105,563 McK (May 24, 2007).
Ex Parte Srinivasa R. Koppolu, C. Douglas Hodges, Barry B. MacKichan, Richard McDaniel, Rao V. Remala, and Antony S. Williams, App. No. 2005-1431 (B.P.A.I. May 24, 2007).
Koppolu Motion 2 (for judgement based on Doyle inequitable conduct), *Doyle* v. *Koppolu*, Patent Interference 105,563 McK (Aug. 15, 2007).
Judgment, *Doyle* v. *Koppolu*, Patent Interference 105,563 McK (Sep. 25, 2007).
Plaintiffs' Local Rule 56.1(a) Response to Defendant's Statement of Additional Facts regarding Plaintiffs' Motion for Summary Judgment on Inequitable Conduct and Exhibits , *Eolas* v. *Microsoft*, Case No. 99 C 0626 (Jul. 19, 2007).
Defendant Microsoft's Local Rule 56.1(a) Response to Plaintiffs' Statement of Additional Facts regarding Microsoft's Motion for Summary Judgment of Obviousness and Exhibits, *Eolas* v. *Microsoft*, Case No. 99 C 0626 (Jul. 18, 2007).
Reply in Support of Microsoft's Motion for Summary Judgment of Obviousness and Exhibits, *Eolas* v. *Microsoft*, Case No. 99 C 0626 (Jul. 18, 2007).
Plaintiffs' Reply Brief in Support of Their Motion for Summary Judgment on Inequitable Conduct, *Eolas* v. *Microsoft*, Case No. 99 C 0626 (Jul. 18, 2007).
Declaration of Edward W. Felten in Support of Plaintiffs' Opposition to Microsoft's Motion for Summary Judgment, *Eolas* v. *Microsoft*, Case No. 99 C 0626 (Jul. 9, 2007).
Plaintiffs' Local Rule 56.1(b)(3) Response to Microsoft Corporation's Statement of Undisputed Facts in Support of its Motion for Summary Judgment of Obviousness, *Eolas* v. *Microsoft*, Case No. 99 C 0626 (Jul. 9, 2007).
Defendant Microsoft's Local Rule 56.1(b)(3) Response to Plaintiffs' Statement of Undisputed Facts, and Microsoft's Statement of Additional Material Facts, in Opposition to Plaintiffs' Motion for Summary Judgment on Inequitable Conduct and Exhibits, *Eolas* v. *Microsoft*, Case No. 99 C 0626 (Jul. 9, 2007).
Plaintiffs' Opposition to Microsoft's Motion for Summary Judgment of Obviousness, *Eolas* v. *Microsoft*, Case No. 99 C 0626 (Jul. 9, 2007).
Defendant Microsoft's Opposition to Plaintiffs' Motion for Summary Judgment on Inequitable Conduct, *Eolas* v. *Microsoft*, Case No. 99 C 0626 (Jul. 9, 2007).
Microsoft's Local Rule 56.1 Statement of Undisputed Facts in Support of its Motion for Summary Judgment of Obviousness and Exhibits, *Eolas* v. *Microsoft*, Case No. 99 C 0626 (Jun. 29, 2007).
Memorandum in Support of Microsoft's Motion for Summary Judgment of Obviousness and Exhibits, *Eolas* v. *Microsoft*, Case No. 99 C 0626 (Jun. 29, 2007).
Microsoft's Offer of Proof and Motion to Reconsider Regarding Revision of Claim Construction (1:99-cv-00626) (N.D. III Apr. 26, 2007).
Declaration of Dr. John P.J. Kelly in Support of Microsoft's Offer of Proof of Non-infringement (199-cv-00626) (N.D. III Apr. 26, 2007).
Reply Brief of Defendant-Appellant Microsoft Corporation (04-1234) (Fed. Cir. Aug. 16, 2004).
Brief of Defendant-Appellant Microsoft Corporation (04-1234) (Fed. Cir. Jun. 3, 2004).
Transcript of Trial Testimony of John Kelly, pp. 2640-2862 (1:99-cv-00626) (N.D. III. Jul. 31, 2003).
Supplemental Expert Witness Report or Larry S. Nixon Pursuant to Fed. R. Civ. P. Rule 26(a)(2)(B) (1:99-cv-00626) (N.D. III. May 21, 2007).
Plaintiffs' Memorandum of Law in opposition to Microsoft Corporation's Offer of Proof and Motion to Reconsider Regarding Revision of Claim Construction (1:99-cv-00626) (N.D. III. May 21, 2007).
Plaintiffs' Statement of Undisputed Facts in Support of Their Motion for Summary Judgment on Inequitable Conduct (1:99-cv-00626) (N.D. III. May 21, 2007).
Plaintiffs' Memorandum of Law in Support of Their Motion for Summary Judgment on Inequitable Conduct and Plaintiffs' Opposition to Defendant's Motion for Leave to Amend its Answer and Counterclaim (1:99-cv-00626) (N.D. III. May 21, 2007).
Supplemental Expert Report of Dr. John P.J. Kelly Regarding Invalidity of United States Patent No. 5,838,906 (1:99-cv-00626) (N.D. III. May 21, 2007).
Corrected Supplemental Expert Witness Report of Larry S. Nixon Pursuant to Fed. R. Civ. P. Rule 26(a)(2)(B) (1:99-cv-00626) (N.D. III May 22, 2007).
Plaintiffs' Sur-Reply Memorandum of Law in Opposition to Defendant's Motion for Leave to Amend its Answer and Counterclaim (1:99-cv-00626) (N.D. III. May 30, 2007).
Plaintiffs' Status Statement for May 31, 2007 Hearing (1:99-cv-00626) (N.D. III. May 30, 2007).
Microsoft's Status Report for May 31, 2007 Hearing (1:99-cv-00626) (N.D. III. May 29, 2007).
Defendant Microsoft's Motion to Continue Trial Pending Newly-Declared Interference in the PTO Between the '906 Patent and Microsoft's Koppolu Patent (1:99-cv-00626) (N.D. III. May 29, 2007).
Defendant Microsoft's Reply Memorandum in Support of its Motion for Leave to Amend its Answer and Counterclaim (1:99-cv-00626) (N.D. III. May 25 2007).
Plaintiffs' Memorandum of Law in Opposition to Microsoft Corporation's Motion to Continue Trial (1:99-cv-00626) (N.D. III. May 30, 2007).
*Eolas* v. *Microsoft* Combined Petition of Microsoft Corporation for Rehearing and Rehearing En Banc (Appeal No. 04-1234 in the U.S. Court of Appeals for the Federal Circuit—Mar. 16, 2005).
In re Srinivasa Koppolu, et al., Appeal No. 2005-1431, U.S. Appl. No. 09/442,070 for reissue of Patent 5,801,701 (B.P.A.I. Nov. 14, 2005).
Notice of Lodging of Deposition Testimony Played in Plaintiffs Case in Chief (Jul. 22, 2003) (Koppolu Testimony).
Expert Witness Report of Larry S. Nixon Pursuant to Fed. R. Civ. P. Rule 26(a)(2)(B) (Dec. 14, 2001).
Office Action issued by the U.S. Patent Office for Reexamination Control U.S. Appl. No. 90/007,858 dated Jul. 30, 2007, 40 pages.
WWW-Talk Archive 1991 printout (retrieved from http://ksi.cpsc.ucalgary.ca/archives/WWW-TALK/www-talk-1991.index.html).

WWW-Talk Archive 1992 printout (retrieved from http://ksi.cpsc.ucalgary.ca/archives/WWW-TALK/www-talk-1992.index.html).
WWW-Talk Archive 1993 Q1 printout (retrieved from http://ksi.cpsc.ucalgary.ca/archives/WWW-TALK/www-talk-1993q1.index.html).
WWW-Talk Archive 1993 Q4 printout (retrieved from http://ksi.cpsc.ucalgary.ca/archives/WWW-TALK/www-talk-1993q4.index.html).
WWW-Talk Archive 1994 Jan. 1 to Jan. 27 printout (retrieved from http://ksi.cpsc.ucalgary.ca/archives/WWW-TALK/www-talk-1994q1.index.html).
OLE 2.0 PDC Questions and Answers (no date).
Stephen Le Hunte, "<EEMBED>—Embedded Objects", HTMl Reference Library—HTMLIB v2.1, 1995: n.pag. Online. Internet.
Andreessen, M., Dec. 1, 1992 post to WWW Talk Mailing list.
Pokrzywa, Joseph R., "ExParte Reexamination Interview Summary", for U.S. Appl. No. 90/007,858, dated Sep. 6, 2007, 4 pages.
Pokrzywa, Joseph R., "Office Action in ExParte Rexamination Reexamination", for U.S. Appl. No. 90/007,858, dated Apr. 18, 2008, 36 pages.
Pokrzywa, Joseph R., "ExParte Reexamination Interview Summary", for U.S. Appl. No. 90/007,858, dated Jun. 3, 2008, 4 pages.
Pokrzywa, Joseph R., "Notice of Intent to Issue ExParte Reexamination Certificate", for U.S. Appl. No. 90/007,858, dated Sep. 10, 2008, 9 pages.
*Eolas Techs., Inc.* v. *Microsoft Corp.*, No. 99-C-626, 2003 U.S. Dist. LEXIS 11476 (N.D. Ill. Jul. 2, 2003).
*Eolas Techs., Inc.* v. *Microsoft Corp.*, 270 F.Supp.2d 997 (N.D. Ill., Jul. 1, 2003).
*Eolas Techs., Inc.* v. *Microsoft Corp.*, No. 99-C-626, 2003 U.S. Dist. LEXIS 6322 (N.D. Ill. Apr. 16, 2003).
*Eolas Techs., Inc.* v. *Microsoft Corp.*, 65 U.S.P.Q.2d 1090 (N.D. Ill. Oct. 18, 2002).
*Eolas Techs., Inc.* v. *Microsoft Corp.*, No. 99-C-626, 2000 U.S. Dist. LEXIS 18886 (N.D. Ill. Dec. 28, 2000).
Complaint and Demand for Jury Trial, *Eolas Techs., Inc.* v. *Microsoft Corp.*, No. 99-C-626 (N.D. Ill) (Feb. 2, 1999).
Answer, *Eolas Techs., Inc.* v. *Microsoft Corp.*, No. 99-C-626 (N.D. Ill) (Mar. 24, 1999).
Microsoft Corporation's Submission Regarding Claim Construction Issues and Scheduling, *Eolas Techs., Inc.* v. *Microsoft Corp.*, No. 99-C-626 (N.D. Ill) (Sep. 7, 1999).
First Amended Answer and Counterclaim, *Eolas Tech., Inc.* v. *Microsoft Corp.*, No. 99-C-626 (N.D. Ill) (Sep. 7, 1999).
Plaintiff's Reply to Microsoft's First Amended Counterclaim, *Eolas Techs., Inc.* v. *Microsoft Corp.*, No. 99-C-626 (N.D. Ill) (Oct. 27, 1999).
Defendant Microsoft Corporation's Initial Brief on Claim Construction Issues, *Eolas Techs., Inc.* v. *Microsoft Corp.*, No. 99-C-626 (N.D. Ill Mar. 24, 1999) (Oct. 14, 2000).
Plaintiff Eolas Techs., Inc. Memorandum in Support of Claim Construction (N.D. Ill Oct. 14, 2000).
Defendant Microsoft Corporation's Reply Brief on Claim Construction Issues, *Eolas Techs., Inc.* v. *Microsoft Corp.*, No. 99-C-626 (N.D. Ill, Oct. 23, 2000).
Plaintiff Eolas Technologies' Reply Memorandum in Support of Claim Construction, *Eolas Techs., Inc.* v. *Microsoft Corp.*, No. 99-C-626 (N.D. Ill Oct. 23, 2000).
Memorandum Opinion and Order, *Eolas Techs., Inc.* v. *Microsoft Corp.*, No. 99-C-626 (N.D. Ill, Dec. 28, 2000).
Plaintiff Eolas Technologies' First Amended Complaint and Demand for Jury Trial, *Eolas Techs., Inc.* v. *Microsoft Corp.*, No. 99-C-626 (N.D. Ill, Apr. 6, 2001) (Apr. 9, 2001).
Defendant Microsoft Corporation's Answer to First Amended Complaint and Second Amended Counterclaim, *Eolas Techs., Inc.* v. *Microsoft Corp.*, No. 99-C-626 (N.D. Ill) (Apr. 18, 2001).
Plaintiff Eolas Technologies' Reply to Defendant's Second Amended Counterclaim, *Eolas Techs., Inc.* v. *Microsoft Corp.*, No. 99-C-626 (N.D. Ill May 2, 2001).
Plaintiff Eolas Technologies' Second Amended Complaint and Demand for Jury Trial, *Eolas Techs., Inc.* v. *Microsoft Corp.*, No. 99-C-626 (N.D. Ill, Aug. 31, 2001) (Aug. 31, 2001).

Defendant Microsoft Corporation's Answer to Second Amended Complaint and Third Amended Counterclaim, *Eolas Techs., Inc.* v. *Microsoft Corp.*, No. 99-C-626 (N.D. Ill) (Sep. 17, 2001).
Plaintiffs' Proposed Jury Instructions Regarding Claim Construction, *Eolas Techs., Inc.* v. *Microsoft Corp.*, No. 99-C-626 (N.D. Ill) (Jan. 27, 2003).
Plaintiffs' Proposed Preliminary and Final Jury Instructions, *Eolas Techs., Inc.* v. *Microsoft Corp.*, No. 99-C-626 (N.D. Ill) (Apr. 25, 2003).
Memorandum of Microsoft Corporation in Support of its Motion to Clarify the Court's *In Limine* Ruling with Respect to Communications about the Viola WWW Browser involving Michael Doyle, *Eolas Techs., Inc.* v. *Microsoft Corp.*, No. 99-C-626 (N.D. Ill) (Jul. 2, 2003).
Plaintiff's Motion to Exclude Extrinsic Evidence of Claimed Pei Wei Invention beyond that Disclosed in the Precise Reference Asserted as Anticipating Prior Art, *Eolas Techs., Inc.* v. *Microsoft Corp.*, No. 99-C-626 (N.D. Ill) (Jul. 22, 2003).
Microsoft's Response to Plaintiffs' Motion to Exclude Extrinsic Evidence of Claimed Pei Wei Invention Beyond that Disclosed in the Precise Reference Asserted as Anticipating Prior Art, *Eolas Techs., Inc.* v. *Microsoft Corp.*, No. 99-C-626 (N.D. Ill) (Jul. 23, 2003).
Microsoft's Motion to Preclude Plaintiffs from Arguing that the Prior Art Lacks Elements not Found in the Claims of the '906 Patent, *Eolas Techs., Inc.* v. *Microsoft Corp.*, No. 99-C-626 (N.D. Ill) (Jul. 28, 2003).
Plaintiffs' Memorandum in Further Support of Their Motion to Exclude Extrinsic Evidence of Claimed Pei Wei Invention, *Eolas Techs., Inc.* v. *Microsoft Corp.*, No. 99-C-626 (N.D. Ill) (Jul. 29, 2003).
Microsoft's Offer of Proof Regarding Viola Prior Art, *Eolas Techs., Inc.* v. *Microsoft Corp.*, No. 99-C-626 (N.D. Ill) (Aug. 5, 2003).
Plaintiffs' Memorandum in Opposition to Microsoft's Offer of Proof Regarding the "Viola Prior Art", *Eolas Techs., Inc.* v. *Microsoft Corp.*, No. 99-C-626 (N.D. Ill, Aug. 11, 2003) (Aug. 7, 2003).
Microsoft's Post-Trial Brief on Inequitable Conduct, *Eolas Techs., Inc.* v. *Microsoft Corp.*, No. 99-C-626 (N.D. Ill) (Aug. 18, 2003).
Plaintiffs' Post-Trial Brief on Microsoft's Inequitable Conduct Claims, *Eolas Techs., Inc.* v. *Microsoft Corp.*, No. 99-C-626 (N.D. Ill) (Aug. 22, 2003).
Microsoft's Response to Plaintiffs' Post-Trial Brief on Inequitable Conduct, *Eolas Techs., Inc.* v. *Microsoft Corp.*, No. 99-C-626 (N.D. Ill) (Aug. 26, 2003).
Plaintiffs' Objections to Microsoft's Offer of Proof Regarding Viola Prior Art, *Eolas Techs., Inc.* v. *Microsoft Corp.*, No. 99-C-626 (N.D. Ill) (Sept. 3, 2003).
Defendant Microsoft's Motion for Judgment as a Matter of Law and a New Trial, *Eolas Techs., Inc.* v. *Microsoft Corp.*, No. 99-C-626 (N.D. Ill) (Oct. 6, 2003).
*Eolas Techs., Inc.* v. *Microsoft Corp.*, 1:99-CV-00626 (Fed. Cir. Jun. 20, 2005).
Microsoft's Motion for Revision of Claim Construction and Summary Judgment of Non-Infringement, *Eolas Techs., Inc.* v. *Microsoft Corp.*, No. 99-C-626 (N.D. Ill) (Dec. 15, 2005).
Declaration of Munir R. Meghjee in Support of Plaintiffs' Memorandum of Law in Opposition to Microsoft Corporation's Motion for Revision of Claim Construction and Summary Judgment of Non-Infringement, *Eolas Techs., Inc.* v. *Microsoft Corp.*, No. 99-C-626 (N.D. Ill) (Jan. 12, 2006).
Plaintiffs' Memorandum of Law in Opposition to Microsoft's Motion for Revision of Claim Construction and Summary Judgment of Non-Infringement, *Eolas Techs., Inc.* v. *Microsoft Corp.*, No. 99-C-626 (N.D. Ill) (Jan. 12, 2006).
Plaintiffs' Local Rule 56.1(b)(3) Response to Microsoft Corporation's Statement of Undisputed Facts in Support of Its Motion for Revision of Claim Construction and Entry of Summary Judgment of Non-Infringement, *Eolas Techs., Inc.* v. *Microsoft Corp.*, No. 99-C-626 (N.D. Ill) (Jan. 12, 2006).
Declaration of Laura L. Donoghue in Support of Microsoft's Reply Memorandum in Support of its Motion for Revision of Claim Construction and Summary Judgment of Noninfringement, *Eolas Techs., Inc.* v. *Microsoft Corp.*, No. 99-C-626 (N.D. Ill) (Jan. 31, 2006).

Plaintiffs' Sur-Reply in Opposition to Microsoft's Motion for Revision of Claim Construction and Summary Judgment of Non-Infringement, *Eolas Techs., Inc.* v. *Microsoft Corp.*, No. 99-C-626 (N.D. Ill) (Feb. 27, 2006).
Defendants' Sur-Rebuttal in Support of its Motion for Revision of Claim Construction and Summary Judgment of Non-Infringement, No. 99-C-626 (N.D. Ill) (Mar. 6, 2006).
Expert Report of Dr. John P.J. Kelly (Dec. 14, 2001).
Rebuttal Expert Report of Edward W. Felten Regarding Validity (Jan. 18, 2002).
Supplemental Expert Report of Dr. John P.J. Kelly (Feb. 1, 2002).
Expert Report of Kraig Brockschmidt (Dec. 12, 2001).
Rebuttal Report of Kraig Brockschmidt.
Expert Report of Robert L. Harmon Regarding Claim Construction.
Rebuttal Expert Report of Robert L. Harmon Pursuant to Rule 26(a)(2)(B). F.R.C.P.
Expert Report of Robert L. Harmon Pursuant to Rule 26(a)(2)(B). F.R.C.P.
Berners-Lee, Tim "HTML, HMML, and HyperTeX" post to WWW-Talk E-mail List (Apr. 21, 1993).
Raggett, Dave, "Standardizing new HTML features" post to WWW-Talk E-mail List (Apr. 27, 1993).
Janssen, Bill, "Re: Standardizing new HTMl features" post to WWW-Talk E-mail List (Apr. 27, 1993).
Andreessen, Marc, "Re: Standardizing new HTML features" post to WWW-Talk E-mail List (Apr. 27, 1993).
Janssen, Bill, "Re: Standardizing new HTML features" post to WWW-Talk E-mail List (Apr. 29, 1993).
Sanders, Tony, "Re: Standardizing new HTML features" post to WWW-Talk E-mail List (Apr. 29, 1993).
Sanders, Tony, "Re: Standardizing new HTML features" post to WWW-Talk E-mail List (Apr. 29, 1993).
Fine, Thomas A., "More than just HTML (was Re: Poetry and Maths)" post to WWW-Talk E-mail List (May 25, 1993).
Raggett, Dave, "Re: More than just HTML (was Re: Poetry and Maths)" post to WWW-Talk E-mail List (May 27, 1993).
Abbey, Jonathan, "Re: Keeping HTML Simple & Format negotiation between Browser & Server" post to WWW-Talk E-mail List (May 27, 1993).
Raggett, Dave, "Re: Keeping HTML Simple & Format negotiation between Browser & Server" post to WWW-Talk E-mail List (Jun. 1, 1993).
Berners-Lee, Tim, "HTML+DTD in ftp://info.cern.ch/pub/www/dev/htmlplus.dtd" post to WWW-Talk E-mail List (Jun. 2, 1993).
Raggett, Dave, "HTML+ support for eqn & Postcript" post to WWW-Talk E-mail List (Jun. 14, 1993).
Janssen, Bill, "Re: HTML+ support for eqn & Postcript" post to WWW-Talk E-mail List (Jun. 14, 1993).
Altis, Kevin, "Re: HTML+ support for eqn & Postcript" post to WWW-Talk E-mail List (Jun. 18, 1993).
Sanders, Tony, "Re: launching executables through HTML" post to WWW-Talk E-mail List (Jun. 19, 1993).
Andreessen, Marc, "Re: launching executables through HTML" post to WWW-Talk E-mail List (Jun. 20, 1993).
Perry, William M., "New Version of The Emacs Browser For W3 (.04b)" post to WWW-Talk E-mail List (Apr. 13, 1993).
Perry, William M., "New Version of WWW Browser For Emacs" post to WWW-Talk E-mail List (Jun. 18, 1993).
Phillips, George Perry, "Re: launching executables through HTML files" post to WWW-Talk E-mail List (Jun. 20, 1993).
Montulli, Lou, "Re: launching executables through HTML files" post to WWW-Talk E-mail List (Jun. 22, 1993).
Raisch, Rob, "Re: Suggestion for a new URL type" post to WWW-Talk E-mail List (Jun. 26, 1993).
VanHeyningen, Marc, "Re: Suggestion for a new URL type" post to WWW-Talk E-mail List (Jun. 26, 1993).
Andreessen, Marc, "Re: Suggestion for a new URL type" post to WWW-Talk E-mail List (Jun. 26, 1993).
Phillips, George, "Re: browser execution" post to WWW-Talk E-mail List (Jun. 28, 1993).
Andreessen, Marc, "browser execution" post to WWW-Talk E-mail List (Jun. 29, 1993).
Sanders, Tony, "Re: browser execution" post to WWW-Talk E-mail List (Jun. 29, 1993).
McRae, Christopher, "Xmosaic and Xv" post to WWW-Talk E-mail List (Jun. 26, 1993).
Deposition Transcript of Pei Wei (Oct. 27, 1999 and Oct. 28, 1999).
Trial Transcript of Dave Raggett, pp. 1804-1897 (Jul. 23, 2003).
Trial Transcript of Pei Wei, pp. 2244-2469 (Jul. 28-29, 2003).
"A Little History of the world Wide Web", n.pag. Online. Internet: available http://www.w3.org/History.html (retrieved Aug. 18, 2006).
"NCSA Mosaic Version Information", n.pag. Online. Internet: available http://www.ncsa.uiuc.edu/SDG/Software.
"The second phase of the revolution", Wired, Oct. 1994, pp. 116-152.
Vetter, Ronald "Mosaic and the World-Wide Web," Computer Magazine, v.27, Iss.10, pp. 49-57, Oct. 1994.
Wynne et al. "Lean Management, Group Support Systems, and Hypermedia: a. Combination Whose Time Has Come," System Sciences, 1993 Annual Hawaii Int'l Conf., pp. 112-121.
Hansen, Wilfred "Andrew as a Multiparadigm Environment for Visual Languages," Visual Languages, 1993 IEEE Symposium, pp. 256-260.
Moran, Patrick "Tele-Nicer-slicer-Dicer: A New Tool for the Visualization of Large Volumetric Data", NCSA Technical Report (TRO14), Aug. 1993.
University of Southern California's Mercury Project—"USC Mercury Project:Interface", Project Milestones, USC Press Release—obtained from Internet, http://www.usc.edu/dept/raiders/.
Hansen, Wilfred "Enhancing documents with embedded programs: How Ness extends in the Andrew ToolKit", IEEE Computer Language, 1990 International Conference.
Tani, M., et al., "Object-Oriented Video: Interaction with Real-World Objects Through Live Video", May 1992, p. 593-598.
Crowley, T., et al., "MMConf: An Infrastructure for Building Shared Multimedia Applications", CSCW 90 Proceedings, Oct. 1990, p. 329-342.
Davis, H., et al., "Towards An Integrated Information Environment With Open Hypermedia System", ACM ECHT Conference, Dec. 1992, pp. 181-190.
Ferrara, F., "The KIM Query System", Abstract, SIGCHI Bulletin, vol. 6, No. 3 Jul. 1994, pp. 30-39.
Gibbs, S., "Composite Multimedia and Active Objects", OOPSLA '91, pp. 97-112.
Davis, H., et al., "Microcosm: An Open Hypermedia System", Interchi '93, Apr. 1993, p. 526.
Vaziri, A., "Scientific Visualization in High-Speed Network Environments", Computer Networks and ISDN Systems 22, 1991, pp. 111-129.
Cullen, J., et al., "The Use of FTAM to access graphical pictures across wide area networks", Computer Networks and ISDN Systems, 1992, pp. 337-383.
Lashkari, Y.Z., et al., "PLX: A Proposal to Implement a General Broadcasting Facility in a Distributed Environment Running X Windows", Comput. & Graphics, vol. 16, No. 2, pp. 143-149, 1992.
Kirste, T., "Spacepicture—An Interactive Hypermedia Satellite Image Archival System", Comput. & Graphics, vol. 17, No. 3, pp. 251-260, 1993.
Coulson, G., et al., "Extensions to ANSA for Multimedia Computing", Computers Networks and ISDN Systems 25, 1992, pp. 305-323.
Huynh, Duong Le, et al., "PIX: An Object-Oriented Network Graphics Environment", Comput. & Graphics, vol. 17, No. 3, pp. 295-304, 1993.
Berners-Lee, T.J., et al., The World-Wide Web, Computer Networks and ISDN Systems 25, 1992, pp. 454-459.
Shackelford, D.E., et al., "The Architecture and Implementation of a Distributed Hypermedia Storage System", Hypertext '93 Proceedings, Nov. 1993, pp. 1-13.
Labriola, D., "Remote Possibilities", PC Magazine, Jun. 14, 1994, pp. 223-228.
Udell, J., "Visual Basic Custom Controls Meet OLE", Byte Magazine, Mar. 1994, pp. 197-200.
Sarna, D.E., et al., "OLE Gains Without (Much) Pain", Datamation Magazine, Jun. 15, 1994, pp. 31 and 113.

Rizzo, J., "What's OpenDoc?", MacUser magazine, Apr. 1994, pp. 119-123.
Fogarty, K., et al., "Microsoft's OLE can be Network Trojan Horse", Network World Magazine, Jun. 27, 1994, vol. 11, No. 26, pp. 1 and 75.
"Cello WWW Browser Release 1.01a", Article obtained from the Internet, ftp.law.cornell.edu/pub/L11/Cello no DDE, Mar. 16, 1994, pp. 2-9.
"OLE 2.0: Death to Monoliths", Byte Magazine, Mar. 1994, p. 122.
Duncan, Ray, "Advanced MSDOS Programming," Microsoft Press, 1986 pp. 390, 391, 486, 487.
Lin, Jin-Kun, "Virtual Screen: A Framework for Task Management," The X Resource, Issue 1, Winter 1992- Proceedings of the 6th Annual X Technical Conference, pp. 191-198, 1992.
Lin, Jin-Kun, "A Multimedia and Multisource Document Editor of an Open Architecture," Dept. of Computer Science, University of N.C. at Chapel Hill, ACM 089791-533-X/92/0010/0057, pp. 57-62, 1992.
Berners-Lee T., et al., Hypertext Markup Language (HTML), Internet Draft IETF (Jun. 1993).
Toye, G., et al., SHARE: A Methodology and Environment for Collaborative Product Development, Proceedings, Second Workshop on Enabling Technologies: Infrastructure for Collaborative Enterprises, 1992, IEEE, pp. 33-47, Apr. 22, 1993.
Lin, J. MediaMosaic—A Multimedia Editing Environment, Proc. Of the 5th Annual ACM Symposium on User Interface Software and Technology, ACM Press, pp. 135-141, 1992.
Engelbart, D., Knowledge-Domain Interoperability and an Open Hyperdocument System, Proc. Of the 1990 ACM Conference on Computer Supported Cooperative Work, ACM Press, pp. 143-156, 1990.
Meyrowitz, N., Intermedia: The Architecture and Construction of an Object-Oriented Hypermedia System and Applications Framework, Proc. Of the Conf. on Object Oriented Programming Systems, Languages, and Applications, ACM Press, pp. 186-201, 1986.
Wiil, U., Issues in the Design of EHTS: A Multiuser Hypertext System for Collaboration, Proc. Of the 25th Hawaii Int'l. Conf. on Systems Sciences, vol. 2, pp. 629-639, Jan. 1992.
Celentano, A., et al., A Multiple Presentation Document Management System, Proc. Of the 10th Annual Int'l Conf. on Systems Documentation, ACM Press, pp. 63-71, 1992.
Garg, P. et al., A Hypertext System to Manage Life Cycle Documents, Proc. Of the 25th Annual Hawaii Int'l Conf. on System Sciences, 1988, IEEE, vol. 2, pp. 337-346, Jan. 1988.
Kahn, P., Webs, Rees, and Stacks: How Hypermedia System Design Effect Hypermedia Content, Designing and Using Human-Computer Interfaces and Knowledge Based Systems, Elsevier Science Publishers, pp. 443-449, 1989.
Streitz, N. et al., Hypertest: Concepts, Systems, and Applications, Cambridge Univ. Press, pp. 1-12, 356-359, 367-369, 1990.
Stotts, P., et al., Hyperdocuments as Automata: Trace-based Browsing Property Verification, UNC CS Technical Report, TR92-038, citeseer.ist.psu.edu/stotts92hyperdocument.html, p. 1, 1992.
Reichard, K., et al., X11R96: the Rumored Changes (Release 6 of the X Window System), UNIX Review, vol. 11, No. 5, p. 101 (pp. 1-4 as printed) (May 1993).
Tool Inter-Operability: A Hands On Demonstration—A Simple Demonstration of How the TookTalk Service Works, Sun Microsystems, Inc., pp. 1-24, 1992.
Palay, A., Andrew Toolkit: An Overview, Tech Rept., Carnegie-Mellon University Information Technology Center, pp. 1-15, 1988.
Dettmer, R., X-Windows—the great integrator, IEE Review, vol. 36, No. 6, pp. 219-222 (Jun. 1990).
The Andrew View, Carnegie Mellon Unic., www-2.cs.cmu.edu/People/AUIS/ftp/NEWSLETTERS/ASCII/93Jun.ascii, vol. 2, No. (pp. 1-12 as printed) (Jun. 1993).
The X Window System and Broadway, www.broadwayinfo.com/bwwhitesbroadwayhct.htm, Humminbird Communications Ltd., pp. 1-11 (1987).
Neuendorffer, T., ADEW: A Multimedia Interface Builder for Andrew, Proceedings Multi-Media Communications, Applications, and Technology Workshop, pp. 1-19 (Jul. 1991).
Letter from America Online, Inc., Microsoft Corp., and Macromedia, Inc (Oct. 14, 2003) and Letter from Adobe Systems Inc. re: Potential Director-Ordered Reexamination of U.S. Patent No. 5,838,906 pursuant to 35 U.S.C. § 303(a) (Oct. 15, 2003) (with cover letter from Sidley, Austin, Brown & Wood LLP) (including attachments).
Anonymous Facsimile re: possible interference (Oct. 16, 2005).
Letter from Stephen Wren (discussing relevance of U.S. Pat. No. 6,055,514 to U.S. Pat. No. 5,838,906) (Feb. 22, 2005).
Letter from Pennie & Edmonds, LLP on behalf of the WWW Consortium, re: Citation of Prior Art Under 35 U.S.C. §301 and 37 C.F.R. 1.501 in Relation to U.S. Patent No. 5,838,906 (Oct. 24, 2003).
Festa, Paul, CNET News.com "Rivalries set Aside in Defense of Internet Explorer" (Sep. 25, 2003) (http://news.com.com/2009-1023_3-5082004.html).
Roberts, Paul, "Microsoft's Patent Loss Rattles Tech Community" (Sep. 3, 2003) (http://www.infoworld.com/article/03/09/03/Hnmicrosoft'sloss_1.html).
Festa, Paul, CNET News.com "Eolas Files Motion to Enjoin IE" (Oct. 8, 2003) (http://news.com.com/2100-1028_3-5088349.html?tag=st+pop).
Lynch, Stephen, "Microsoft Rivals Join Patent Fight; M'Soft Rivals Join to Wage Patent Fight" N.Y.Post (Oct. 9, 2003).
O'Reilly Network, Patent List (Jul. 10, 2003).
Ray Ozzie, "Saving the Browser," Weblog entry (2003) (discussing Lotus Notes R3 relevance to the patent).
"Microsoft's OLE can be network Trojan horse," Network World Magazine, vol. 11, No. 26, Jul. 27, 1994.
Object linking and Embedding OLE 2.01 Design Specification (Sep. 27, 1993).
Programming for Windows with Object Linking and Embedding 2.0 (Mar. 1, 1993).
Extensible Compound Document Architecture Client and Server API specification (no date).
Pei Y. Wei, "X Browser" (e-mail to www-talk discussion list) (Dec. 13, 1991).
Pei Y. Wei, "X Browser" (e-mail to www-talk discussion list) (Dec. 13, 1994).
Dale Dougherty, "WWW Developer's Conference" (e-mail to www-talk discussion list) (Jun. 19, 1993).
Pei Wei, "Re: Universal network graphics language" (e-mail to www-talk discussion list) (Jan. 28, 1994).
Pei Wei, "Viola WWW beta release is available" (e-mail to www-talk discussion list) (Feb. 25, 1994).
Pei Wei, "Re: World Wide Web and Viola" (e-mail to www-talk discussion list) (May 13, 1992).
Pei Wei, "A Brief Overview of the VIOLA Engine, and its applications" (MSET 0009788-0009801)(no date).
Pei Wei, "A Brief Overview of the VIOLA Engine, and its applications" (InterNIC details for http://www.viola.org) (retrieved from http://www.internicdomainnames.com).
Pei Wei, "A Brief Overview of the VIOLA Engine, and its applications" (TT05417-05433) (1994) (retrieved on Aug. 4, 1998 from http://scam.xcf/berkeley.edu/~wei/viola/violaIntro.html).
Pei Wei, "A Brief Overview of the VIOLA Engine, and its applications" (E0714—021725) (1994) (retrieved from http://scam.xcf.berkeley.edu/~wei/viola/violaIntro.html).
Pei Wei, "A Brief Overview of the VIOLA Engine, and its applications" (TT 05441-13 05600) (1994) (including "Viola in a Nutshell: the Viola World Wide Web Toolkit" from http://scam.xcf/berkeley.edu/~wei/viola/book).
Pei Wei, "A Brief Overview of the VIOLA Engine, and its applications" ((MSET 0000026—0000036) (retrieved from http://scam.xcf.berkeley.edu/~wei/viola/violaIntro.html).
Pei Wei, "Re: FYI . . . press release," (e-mail to www-vrml@wired.com) (Aug. 31, 1994).
Pei Wei, "Re: FYI . . . press release," (e-mail to www-talk discussion list) (Aug. 31, 1994).
Pei Wei, "Re: FYI . . . press release," (e-mail to mddoyle@netcom.com) (Sep. 1, 1994).
Michael Doyle, "Re: More RE: FYI . . . Press release" (e-mail to Pei Wei) (Sep. 1, 1994).
Pei Wei, "Re: FYI . . . press release," (e-mail to vrml discussion list) (Sep. 1, 1994).
Michael Doyle, "Scripts vs APIs" (e-mail to vrml discussion list) (Sep. 1, 1994).
Pei Wei "WWW Browsers Extensibility Issues," Stanford Computer Forum WWW Workshop-Sep. 20-21, 1994.
Pei Wei, "Extensibility in WWW Browsers" Stanford Computer Forum WWW Workshop-Sep. 20-21, 1994.
Michael Doyle, "Re: Hot Java is here! And it *rocks*" (e-mail to www-talk discussion list) (Mar. 27, 1995).
Pei Wei, "Re: EOLAS Acquires Milestone Internet Software Patent" (e-mail to www-talk discussion list) (Aug. 21, 1995).

Pei Wei, "Re: EOLAS Acquires Milestone Internet Software Patent" (e-mail to www-talk discussion list) (Aug. 21, 1995).
Tim Berners-Lee, Press Release: "The World Wide Web—past, present and future" (Jul. 17, 1996) (retrieved from http://www.bcs.org.uk/news/timbl.htm).
Pei Wei, "Re: Universal network graphics language" (e-mail to www-talk discussion list) (Jan. 28, 1994).
Microsoft Product Support Services Application Note (Text File) GC0165:Rich-Text Format (RTF) Specification (Jun. 1992).
Tim Berners-Lee, "HTML + DTD in ftp://info.cern.ch/pub/www/dev/htmlplus.dtd" (e-mail to www-talk discussion list) (Jun. 2, 1993).
Dave Raggett, "HTML + support for eqn & Postscript" (e-mail to www-talk discussion list) (Jun. 14, 1993).
Dave Raggett, "HTML + support for eqn & Postscript" (e-mail to www-talk discussion list) (Jun. 14, 1993).
Christopher J. McRae, "Re: Xmosaic and Xv" (e-mail to www-talk discussion list) (Jun. 26, 1993).
Dave Raggett, "HTMl + (Hypertext markup language)" (Jul. 23, 1993).
William Perry, "Re: Interest in HTML Conformance?" (e-mail to www-talk discussion list) (Apr. 17, 1994).
William Perry, "Presentation Tags, etc." (e-mail to Tony Jebson) (May 5, 1994).
William Perry, "Re: Where can I find doc on embedding X windows in Lemacs buffers?" (e-mail to help-lucid-emacs) (May 28, 1994).
Jeff Sparkes, "Re: Where can I find doc on embedding X windows in Lemacs buffers?" (e-mail to help-lucid-emacs) (May 31, 1994).
Daniel Connolly, "Re: HTML 2.0 specification" (e-mail to wmperry@spry.com (Sep. 2, 1994).
NCSA Software Development Group, "Introducing NCSA Mosaic" (Dec. 1993).
Kraig Brockschmidt, Programming for Windows with Object Linking and Embedding (OLD) 2.0 Draft (no date).
Kraig Brockschmidt, "Inside OLE 2.0" Microsoft Press (Oct. 1993).
ECDA extensible Compound Document Architecture (Jul. 10, 1990).
Microsoft Corporation, "Information At Your Fingertips Backgrounder" (Dec. 1990).
Microsoft Corporation, Object Landing & embedding—Extensible Application Protocols (Apr. 8, 1991).
Microsoft Corporation, "OLE 2.0 Design Summary" (Jul. 5, 1991).
Microsoft Corporation, "OLE 2.0 Architecture and Protocol Proposal" (Jul. 9, 1991).
Microsoft Corporation, "OLE 2.0 Design Specification" (Apr. 15, 1993).
Microsoft Corporation, "Microsoft OLE 2.0 Developers Conference Previews Applications Using Object Technology for Windows" (May 3, 1993).
Microsoft Corporation, "Windows Objects: Object Linking & Embedding 2.0 Developers Conference" (May 3, 1993).
Stuart J. Johnston and Vance McCarthy, "Developers get hands on complex but vital OLE 2.0", Info World, vol. 15, issue 19 (May 10, 1993).
Kraig Brockschmidt, "Programming for Windows with Object Linking and Embedding 2.0" Preliminary Draft (Apr. 19, 1993).
Microsoft Corporation, OLE 2.01 Design Specification.
Microsoft Corporation, "Microsoft OLE Controls-Specification Overview" (Jan. 1994).
Microsoft Corporation, "Microsoft Multimedia View Publishing Toolkit" 1 of 3 volumes: Getting Started, "Authoring Guide" and "Technical Reference" (1993).
Microsoft Corporation, "Microsoft Multimedia View Publishing Toolkit" 2 of 3 volumes: Getting Started, "Authoring Guide" and "Technical Reference" (1993).
Microsoft Corporation, "Microsoft Multimedia View Publishing Toolkit" 3 of 3 volumes: Getting Started, "Authoring Guide" and "Technical Reference" (1993).
Microsoft Corporation, "Microsoft Multimedia View Publishing Toolkit" compact disc, Getting Started, "Authoring Guide" and "Technical Reference" (1993).
E-mail From Ang Re: Plan (Oct. 8, 1994).
Bert Bos, "Re: Structured text v. page descriptions" (e-mail to David C. Martin) (Nov. 3, 1994).
Microsoft Windows Win32 Professional Developers Conference Information Packet including a Microsoft Non-Disclosure Agreement (Oct. 18, 1993).
Maritz, P—Microsoft Letter to Microsoft Win32 Professional Developers Conference Attendees (Nov. 8, 1993).
Kraig Brockschmidt, "A Primer on Designing Custom Controls," Microsoft System Journal, Mar.-Apr. 1992.
Microsoft Corporation, "Object Linking and Embedding Backgrounder" (Dec. 1990).
Microsoft Corporation, "Compoound Documents Backgrounder" (Dec. 1990).
Rude Q&A OLE.
Microsoft Corporation, "OLE Controls Architecture" Version 0.6 (Sep. 1, 1993).
Kraig Brockschmidt, "OLE 2.0: implementing Visual Editing (In-Place Activation)" (Nov. 1993).
Kraig Brockschmidt, "Chapter One: OLE Controls Architecture" (Nov. 10, 1993).
Microsoft Corporation, "OLE Controls Architecture" Version 0.7 (Nov. 17, 1993).
Microsoft Corporation, "OLE Controls Architecture" Version 0.2 (May 15, 1993).
Kraig Brockschmidt, "Network DDE in Windows for Workgroups 3.1 Bridges Programs Between PCs", Microsoft Systems Journal, Jan. 1993.
Microsoft Corporation, "Object Linking & Embedding Version 2.0 Programmer's Reference" (Apr. 15, 1993).
Moeller, Michael, et al., "Microsoft Maps New OCX: Plan; ActiveX Seen as Web content Platform," PC Week vol. 13, No. 10, p. 1 (Mar. 11, 1996).
Marovac, Nenad et al., "Hypernet: A Tool to Choreograph Worldwide Distributed Hypermedia Documents," Comput & Graphics vol. 16, No. 2, pp. 197-202 (1992).
Netscape Communications Corp., Press Release: "Netscape Communications Offers New Network Navigator Free on the Internet" (1998).
Sackman, Gleason, "WWW>Telerobotics via the Web(fwd)" (e-mail to comp.infosystems discussion list) (Sep. 7, 1994).
"The Pattern in the Mosaic: An Interview with Jim Clark and Marc Andreesen," Network Computing, p. 44 (Jan. 15, 1994).
Oliver, Dick, "Netscape Unleashed" (1996).
"Reply by Third Party Requester Under C.F.R. 1.535" (May 5, 2006).
"WWW-Talk Electronic Mailing List Contributors from Jan. 1993 Through Jun. 1993".
"World-Wide Web Mailing Lists," retrieved from http://www.bilkent.edu.tr/pub/WWW/Mail/Lists.html (May 2, 2006).
Hughes, Kevin, "Entering the World-Wide Web: A Guide to Cyberspace" (Oct. 1993) (http://w3.cib.unibo.it/intro/www-guide/www.guide.html.
Thomas, Eric, "LISTSERV for the Non-Technical User" (Sep. 18, 1993).
Andreessen, Marc, "NCSA Mosaic Technical Summary" (May 8, 1993).
Weber, Jay C., "Protest of Patent #5,838,906 under 37 CFR 1.291, and Citation of Prior Art for # 5,838,906, under 37 CFR 1.502" (including attachments) (Feb. 6, 2004).
Earlier Viola Source Code; enclosed CD; viola930512.tar.gz.zip.
Later Viola Source Code; enclosed CD; violaTOGO.tar.gz.zip.
Ragett, D., HTML+(Hypertext Markup Language), (Jul. 23, 1993).
Ragget, D., Posting of Dave Raggett, dsr@hplb.hpl.hp.com to www-talk@nxocOl.cern.ch (W-WW-Talk public mailing list).
WWW-Talk Archive 1993 Q2 and 1993 Q3 (Apr. to Oct. 1993) (available at http://ksi.cpsc.ucalgary.ca/archives/WWW-TALK/).
Missing Messages 0982-0999 from WWW-Talk Archive 1993Q2 and 1993Q3 (Apr. to Oct. 1993) (retrieved from http://1997.webhistory.org/www.lists/www-talk.1993q2/ and http://1997.webhistory.org/www.lists/www-talk.1993q3/).

* cited by examiner

DISTRIBUTED HYPERMEDIA METHOD AND SYSTEM FOR AUTOMATICALLY INVOKING EXTERNAL APPLICATION PROVIDING INTERACTION AND DISPLAY OF EMBEDDED OBJECTS WITHIN A HYPERMEDIA DOCUMENT

RELATED APPLICATIONS

This application is a continuation and claims the benefit of U.S. application Ser. No. 09/075,359, filed May 8, 1998 now abandoned, which is a continuation of U.S. application Ser. No. 08/324,443, filed Oct. 17, 1994 now U.S. Pat. No. 5,838,906, the disclosures of which are hereby incorporated by reference.

BACKGROUND OF THE INVENTION

This invention relates generally to manipulating data in a computer network, and specifically to retrieving, presenting and manipulating embedded program objects in distributed hypermedia systems.

Computer networks are becoming increasingly popular as a medium for locating and accessing a wide range of data from locations all over the world. The most popular global network is the Internet with millions of computer systems connected to it. The Internet has become popular due to widely adopted standard protocols that allow a vast interconnection of computers and localized computer networks to communicate with each other. Computer systems connected to a network such as the Internet may be of varying types, e.g., mainframes, workstations, personal computers, etc. The computers are manufactured by different companies using proprietary hardware and operating systems and thus have incompatibilities in their instruction sets, busses, software, file formats and other aspects of their architecture and operating systems. Localized computer networks connected to the Internet may be incompatible with other computer systems and localized networks in terms of the physical layer of communication including the specific hardware used to implement the network. Also, different networks use differing, incompatible protocols for transferring information and are not able to communicate with each other without a translation mechanism such as a "gateway".

The Internet provides a uniform and open standard for allowing various computers and networks to communicate with each other. For example, the Internet uses Transfer Control Protocol/Internet Protocol ("TCP/IP") that defines a uniform packet-switched communication standard which is ultimately used in every transfer of information that takes place over the Internet.

Other Internet standards are the HyperText Transmission Protocol ("HTTP") that allows hypertext documents to be exchanged freely among any computers connected to the Internet and HyperText Markup Language ("HTML") that defines the way in which hypertext documents designate links to information. See, e.g., Berners-Lee, T. J., "The world-wide web," Computer Networks and ISDN Systems 25 (1992).

A hypertext document is a document that allows a user to view a text document displayed on a display device connected to the user's computer and to access, retrieve and view other data objects that are linked to hypertext words or phrases in the hypertext document. In a hypertext document, the user may "click on," or select, certain words or phrases in the text that specify a link to other documents, or data objects. In this way, the user is able to navigate easily among data objects. The data objects may be local to the user's computer system or remotely located over a network. An early hypertext system is Hypercard, by Apple Computer, Inc. Hypercard is a standalone system where the data objects are local to the user's system.

When a user selects a phrase in a hypertext document that has an associated link to another document, the linked document is retrieved and displayed on the user's display screen. This allows the user to obtain more information in an efficient and easy manner. This provides the user with a simple, intuitive and powerful way to "branch off" from a main document to learn more about topics of interest.

Objects may be text, images, sound files, video data, documents or other types of information that is presentable to a user of a computer system. When a document is primarily text and includes links to other data objects according to the hypertext format, the document is said to be a hypertext document. When graphics, sound, video or other media capable of being manipulated and presented in a computer system is used as the object linked to, the document is said to be a hypermedia document. A hypermedia document is similar to a hypertext document, except that the user is able to click on images, sound icons, video icons, etc., that link to other objects of various media types, such as additional graphics, sound, video, text, or hypermedia or hypertext documents.

FIG. 1 shows examples of hypertext and hypermedia documents and links associating data objects in the documents to other data objects. Hypermedia document includes hypertext 20, an image icon at 22, a sound icon at 24 and more hypertext 26. FIG. 1 shows hypermedia document 10 substantially as it would appear on a user's display screen. The user is able to select, or "click" on icons and text on a display screen by using an input device, such as a mouse, in a manner well-known in the art.

When the user clicks on the phrase "hypermedia," software running on the user's computer obtains the link associated with the phrase, symbolically shown by arrow 30, to access hypermedia document 14. Hypermedia document 14 is retrieved and displayed on the user's display screen. Thus, the user is presented with more information on the phrase "hypermedia." The mechanism for specifying and locating a linked object such as hypermedia document 14 is an HTML "element" that includes an object address in the format of a Uniform Resource Locator (URL).

Similarly, additional hypertext 26 can be selected by the user to access hypertext document 12 via link 32 as shown in FIG. 1. If the user selects additional hypertext 26, then the text for hypertext document 12 is displayed on the user screen. Note that hypertext document 12, itself, has hypertext at 28. Thus, the user can click on the phrase "hypermedia" while viewing document 12 to access hypermedia document 14 in a manner similar to that discussed above.

Documents, and other data objects, can be referenced by many links from many different source documents. FIG. 1 shows document 14 serving as a target link for both documents 10 and 12. A distributed hypertext or hypermedia document typically has many links within it that specify many different data objects located in computers at different geographical locations connected by a network. Hypermedia document 10 includes image icon 22 with a link to image 16. One method of viewing images is to include an icon, or other indicator, within the text.

Typically, the indicator is a very small image and may be a scaled down version of the full image. The indicator may be shown embedded within the text when the text is displayed on the display screen. The user may select the indicator to obtain the full image. When the user clicks on image icon 22 browser software executing on the user's computer system retrieves the corresponding full image, e.g., a bit map, and displays it by using external software called a "viewer." This results in the full image, represented by image 16, being displayed on the screen.

An example of a browser program is the National Center for Supercomputing Application's (NCSA) Mosaic software developed by the University of Illinois at Urbana/Champaign, Ill. Another example is "Cello" available on the Internet at http://www.law.cornell.edu/. Many viewers exist that handle various file formats such as ".TIF," ".GIF," formats. When a browser program invokes a viewer program, the viewer is launched as a separate process. The view displays the full image in a separate "window" (in a windowing environment) or on a separate screen. This means that the browser program is no longer active while the viewer is active. By using indicators to act as place holders for full images that are retrieved and displayed only when a user selects the indicator, data traffic over the network is reduced. Also, since the retrieval and display of large images may require several seconds or more of transfer time the user does not have to wait to have images transferred that are of no interest to the user.

Returning to FIG. 1, another type of data object is a sound object shown as sound icon 24 within the hypermedia document. When the user selects sound icon 24, the user's computer accesses sound data shown symbolically by data file 40. The accessed sound data plays through a speaker or other audio device.

As discussed above, hypermedia documents allow a user to access different data objects. The objects may be text, images, sound files, video, additional documents, etc. As used in this specification, a data object is information capable of being retrieved and presented to a user of a computer system. Some data objects include executable code combined with data. An example of such a combination is a "self-extacting" data object that includes code to "unpack" or decompress data that has been compressed to make it smaller before transferring. When a browser retrieves an object such as a self-extracting data object the browser may allow the user to "launch" the self-extracting data object to automatically execute the unpacking instructions to expand the data object to its original size. Such a combination of executable code and data is limited in that the user can do no more than invoke the code to perform a singular function such as performing the self-extraction after which time the object is a standard data object.

Other existing approaches to embedding interactive program objects in documents include the Object Linking and Embedding (OLE) facility in Microsoft Windows, by Microsoft Corp., and OpenDoc, by Apple Computer, Inc. At least one shortcoming of these approaches is that neither is capable of allowing a user to access embedded interactive program objects in distributed hypermedia documents over networks.

FIG. 2 is an example of a computer network. In FIG. 2, computer systems are connected to Internet 100, although in practice Internet 100 may be replaced by any suitable computer network. In FIG. 2, a user 102 operates a small computer 104, such as a personal computer or a work station. The user's computer is equipped with various components, such as user input devices (mouse, trackball, keyboard, etc.), a display device (monitor, liquid crystal display (LCD), etc.), local storage (hard disk drive, etc.), and other components. Typically, small computer 104 is connected to a larger computer, such as server A at 106. The larger computer may have additional users and computer systems connected to it, such as computer 108 operated by user 110. Any group of computers may form a localized network. A localized network does not necessarily adopt the uniform protocols of the larger interconnecting network (i.e., Internet 100) and is more geographically constrained than the larger network. The localized network may connect to the larger network through a "gateway" or "node" implemented on, for example, a server.

Internet 100 connects other localized networks, such as server B at 120, which interconnects users 122, 124 and 126 and their respective computer systems to Internet 100. Internet 100 is made up of many interconnected computer systems and communication links. Communication links may be by hardwire, fiber optic cable, satellite or other radio wave propagation, etc. Data may move from server A to server B through any number of intermediate servers and communication links or other computers and data processing equipment not shown in FIG. 2 but symbolically represented by Internet 100.

A user at a workstation or personal computer need not connect to the Internet via a larger computer, such as server A or server B. This is shown, for example, by small computer 130 connected directly to Internet 100 as by a telephone modem or other link. Also, a server need not have users connected to it locally, as is shown by server C at 132 of FIG. 2. Many configurations of large and small computers are possible.

Typically, a computer on the Internet is characterized as either a "client" or "server" depending on the role that the computer is playing with respect to requesting information or providing information. Client computers are computers that typically request information from a server computer which provides the information. For this reason, servers are usually larger and faster machines that have access to many data files, programs, etc., in a large storage associated with the server. However, the role of a server may also be adopted by a smaller machine depending on the transaction. That is, user 110 may request information via their computer 108 from server A. At a later time, server A may make a request for information from computer 108. In the first case, where computer 108 issues a request for information from server A, computer 108 is a "client" making a request of information from server A. Server A may have the information in a storage device that is local to Server A or server A may have to make requests of other computer systems to obtain the information. User 110 may also request information via their computer 108 from a server, such as server B located at a remote geographical location on the Internet. However, user 110 may also request information from a computer, such as small computer 124, thus placing small computer 124 in the role of a "server." For purposes of this specification, client and server computers are categorized in terms of their predominant role as either an information requester or provider. Clients are generally information requesters, while servers are generally information providers.

Referring again to FIG. 1, data objects such as distributed hypermedia documents 10, 12 and 14, image 16 and sound data file 40, may be located at any of the computers shown in FIG. 2. Since these data objects may be linked to a document located on another computer the Internet allows for remote object linking.

For example, hypertext document 10 of FIG. 1 may be located at user 110's client computer 108. When user 110 makes a request by, for example, clicking on hypertext 20 (i.e., the phrase "hypermedia"), user 110's small client computer 108 processes links within hypertext document 10 to retrieve document 14. In this, example, we assume that document 14 is stored at a remote location on server B. Thus, in this example, computer 108 issues a command that includes the address of document 14. This command is routed through server A and Internet 100 and eventually is received by server B. Server B processes the command and locates document 14 on its local storage. Server 14 then transfers a copy of the document back to client 108 via Internet 100 and server A. After client computer 108 receives document 14, it is displayed so that user 110 may view it.

Similarly, image object 16 and sound data file 40 may reside at any of the computers shown in FIG. 2. Assuming image object 16 resides on server C when user 110 clicks on image icon 22, client computer 108 generates a command to retrieve image object 16 to server C. Server C receives the command and transfers a copy of image object 16 to client computer 108. Alternatively, an object, such as sound data file 40, may reside on server A so that it is not necessary to traverse long distances via the Internet in order to retrieve the data object.

The Internet is said to provide an "open distributed hypermedia system." It is an "open" system since Internet 100 implements a standard protocol that each of the connecting computer systems, 106, 130, 120, 132 and 134 must implement (TCP/IP). It is a "hypermedia" system because it is able to handle hypermedia documents as described above via standards such as the HTTP and HTML hypertext transmission and mark up standards, respectively. Further, it is a "distributed" system because data objects that are imbedded within a document may be located on many of the computer systems connected to the Internet. An example of an open distributed hypermedia system is the so-called "world-wide web" implemented on the Internet and discussed in papers such as the Berners-Lee reference given above.

The open distributed hypermedia system provided by the Internet allows users to easily access and retrieve different data objects located in remote geographic locations on the Internet. However, this open distributed hypermedia system as it currently exists has shortcomings in that today's large data objects are limited largely by bandwidth constraints in the various communication links in the Internet and localized networks, and by the limited processing power, or computing constraints, of small computer systems normally provided to most users. Large data objects are difficult to update at frame rates fast enough (e.g., 30 frames per second) to achieve smooth animation. Moreover, the processing power needed to perform the calculations to animate such images in real time does not exist on most workstations, not to mention personal computers. Today's browsers and viewers are not capable of performing the computation necessary to generate and render new views of these large data objects in real time.

For example, the Internet's open distributed hypermedia system allows users to view still images. These images are simple non-interactive two-dimensional images, similar to photographs. Much digital data available today exists in the form of high-resolution multi-dimensional image data (e.g., three dimensional images) which is viewed on a computer while allowing the user to perform real time viewing transformations on the data in order for the user to better understand the data.

An example of such type of data is in medical imaging where advanced scanning devices, such as Magnetic Resonance Imaging (MRI) and Computed Tomography (CT), are widely used in the fields of medicine, quality assurance and meteorology to present physicians, technicians and meteorologists with large amounts of data in an efficient way. Because visualization of the data is the best way for a user to grasp the data's meaning, a variety of visualization techniques and real time computer graphics methods have been developed. However, these systems are bandwidth-intensive and compute-intensive and often require multiprocessor arrays and other specialized graphics hardware to carry them out in real time. Also, large amounts of secondary storage for data are required. The expense of these requirements has limited the ability of researchers to readily exchange findings since these larger computers required to store, present and manipulate images are not available to many of the researchers that need to have access to the data.

On the other hand, small client computers in the form of personal computers or workstations such as client computer 108 of FIG. 2 are generally available to a much larger number of researchers. Further, it is common for these smaller computers to be connected to the Internet. Thus, it is desirable to have a system that allows the accessing, display and manipulation of large amounts of data, especially image data, over the Internet to a small, and relatively cheap, client computer.

Due to the relatively low bandwidth of the Internet (as compared to today's large data objects) and the relatively small amount of processing power available at client computers, many valuable tasks performed by computers cannot be performed by users at client computers on the Internet. Also, while the present open distributed hypermedia system on the Internet allows users to locate and retrieve data objects it allows users very little, if any, interaction with these data objects. Users are limited to traditional hypertext and hypermedia forms of selecting linked data objects for retrieval and launching viewers or other forms of external software to have the data objects presented in a comprehensible way.

Thus, it is desirable to have a system that allows a user at a small client computer connected to the Internet to locate, retrieve and manipulate data objects when the data objects are bandwidth-intensive and compute-intensive. Further, it is desirable to allow a user to manipulate data objects in an interactive way to provide the user with a better understanding of information presented and to allow the user to accomplish a wider variety of tasks.

BRIEF SUMMARY OF THE INVENTION

The present invention provides a method for running embedded program objects in a computer network environment. The method includes the steps of providing at least one client workstation and one network server coupled to the network environment where the network environment is a distributed hypermedia environment; displaying, on the client workstation, a portion of a hypermedia document received over the network from the server, where the hypermedia document includes an embedded controllable application; and interactively controlling the embedded controllable application from the client workstation via communication sent over the distributed hypermedia environment.

The present invention allows a user at a client computer connected to a network to locate, retrieve and manipulate objects in an interactive way. The invention not only allows the user to use a hypermedia format to locate and retrieve program objects, but also allows the user to interact with an application program located at a remote computer. Interprocess communication between the hypermedia browser and the embedded application program is ongoing after the program object has been launched. The user is able to use a vast amount of computing power beyond that which is contained in the user's client computer.

In one application, high resolution three dimensional images are processed in a distributed manner by several computers located remotely from the user's client computer. This amounts to providing parallel distributed processing for tasks such as volume rendering or three dimensional image transformation and display. Also, the user is able to rotate, scale and otherwise reposition the viewpoint with respect to these images without exiting the hypermedia browser software. The control and interaction of viewing the image may be provided within the same window that the browser is using assuming the environment is a "windowing" environment. The viewing transformation and volume rendering calculations may be performed by remote distributed computer systems.

Once an image representing a new viewpoint is computed the frame image is transmitted over the network to the user's client computer where it is displayed at a designated position within a hypermedia document. By transmitting only enough information to update the image, the need for a high bandwidth data connection is reduced. Compression can be used to further reduce the bandwidth requirements for data transmission.

Other applications of the invention are possible. For example, the user can operate a spreadsheet program that is being executed by one or more other computer systems connected via the network to the user's client computer. Once the spreadsheet program has calculated results, the results may be sent over the network to the user's client computer for display to the user. In this way, computer systems located remotely on the network can be used to provide the computing power that may be required for certain tasks and to reduce the data bandwidth by only transmitting results of the computations.

Still other applications of the present invention are possible, as disclosed in the specification, below.

DETAILED DESCRIPTION OF THE INVENTION 375 pages of Source code on 4 microfiche Appendices A and B are provided to this specification. The source code should be consulted to provide details of a specific embodiment of the invention in conjunction with the discussion of the routines in this specification. The source code in Appendix A includes NCSA Mosaic version 2.4 source code along with modifications to the source code to implement the present invention. Appendix B includes source code implementing an application program interface. The source code is written in the "C" computer language to run on an X-Window platform.

Figure 3:
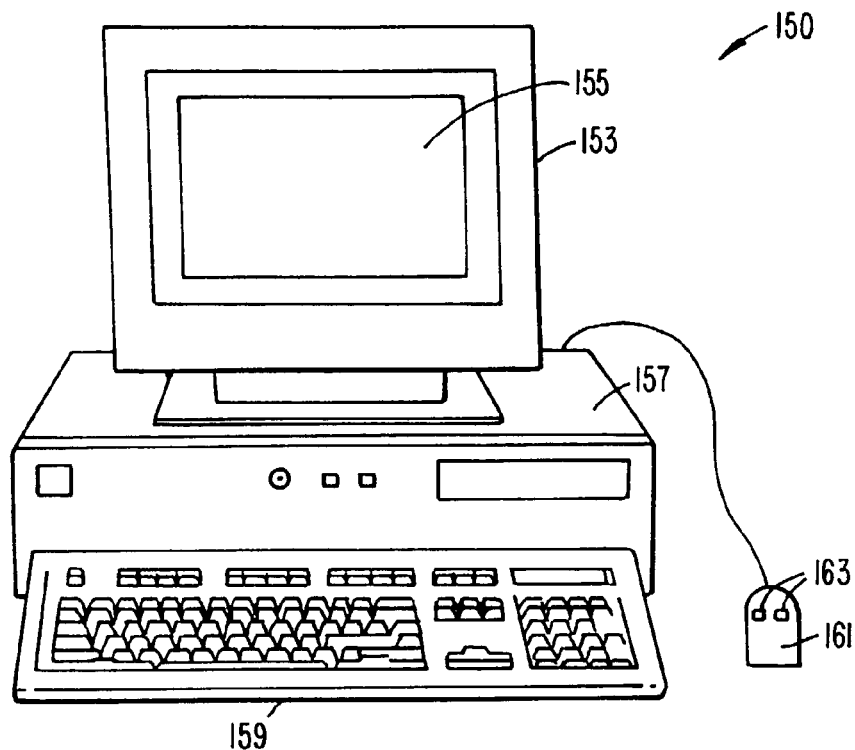
FIG. 3 is an illustration of a computer system suitable for use with the present invention.

FIG. 3 is an illustration of a computer system suitable for use with the present invention. FIG. 3 depicts but one example of many possible computer types or configurations capable of being used with the present invention. FIG. 3 shows computer system 150 including display device 153, display screen 155, cabinet 157, keyboard 159 and mouse 161.

Mouse 161 and keyboard 159 are "user input devices." Other examples of user input devices are a touch screen, light pen, track ball, data glove, etc. Mouse 161 may have one or more buttons such as buttons 163 shown in FIG. 3. Cabinet 157 houses familiar computer components such as disk drives, a processor, storage means, etc. As used in this specification "storage means" includes any storage device used in connection with a computer system such as disk drives, magnetic tape, solid state memory, bubble memory, etc. Cabinet 157 may include additional hardware such as input/output (I/O) interface cards for connecting computer system 150 to external devices such as an optical character reader, external storage devices, other computers or additional devices.

Figure 4:
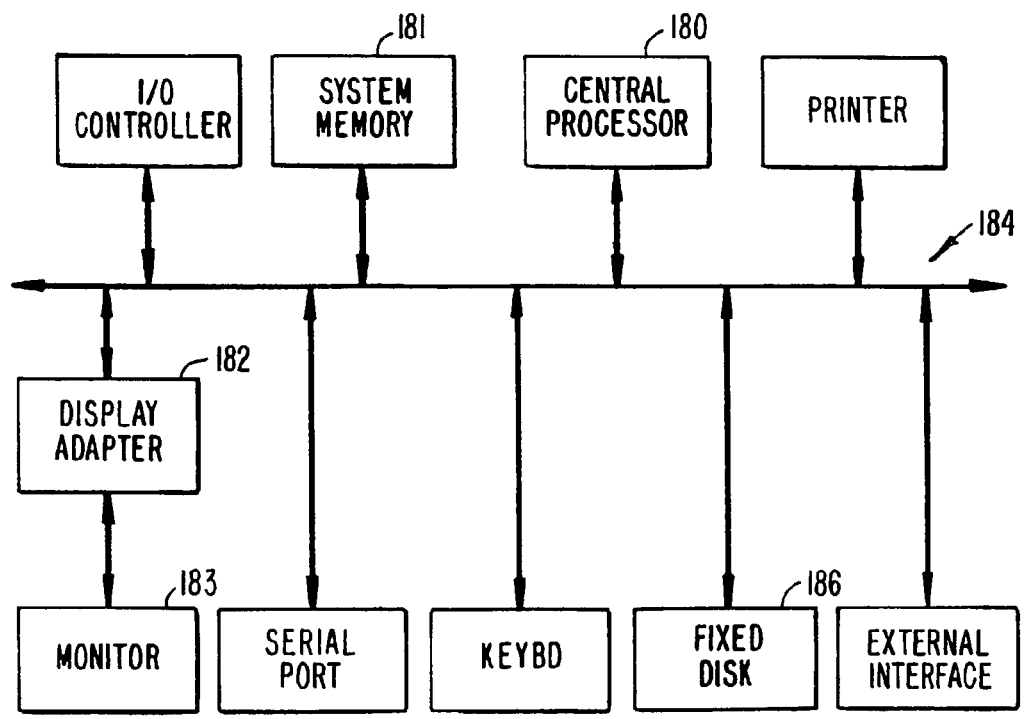
FIG. 4 is an illustration of basic subsystems in the computer system of FIG. 3.

FIG. 4 is an illustration of basic subsystems in computer system 150 of FIG. 3. In FIG. 4, subsystems are represented by blocks such as central processor 180, system memory 181 consisting of random access memory (RAM) and/or read-only memory (ROM), display adapter 182, monitor 183 (equivalent to display device 153 of FIG. 3), etc. The subsystems are interconnected via a system bus 184. Additional subsystems such as a printer, keyboard, fixed disk and others are shown. Peripherals and input/output (I/O) devices can be connected to the computer system by, for example serial port 185. For example, serial port 185 can be used to connect the computer system to a modem for connection to a network or serial port 185 can be used to interface with a mouse input device. The interconnection via system bus 184 allows central processor 180 to communicate with each subsystem and to control the execution of instructions from system memory 181 or fixed disk 186, and the exchange of information between subsystems. Other arrangements of subsystems and interconnections are possible.

Figure 5:
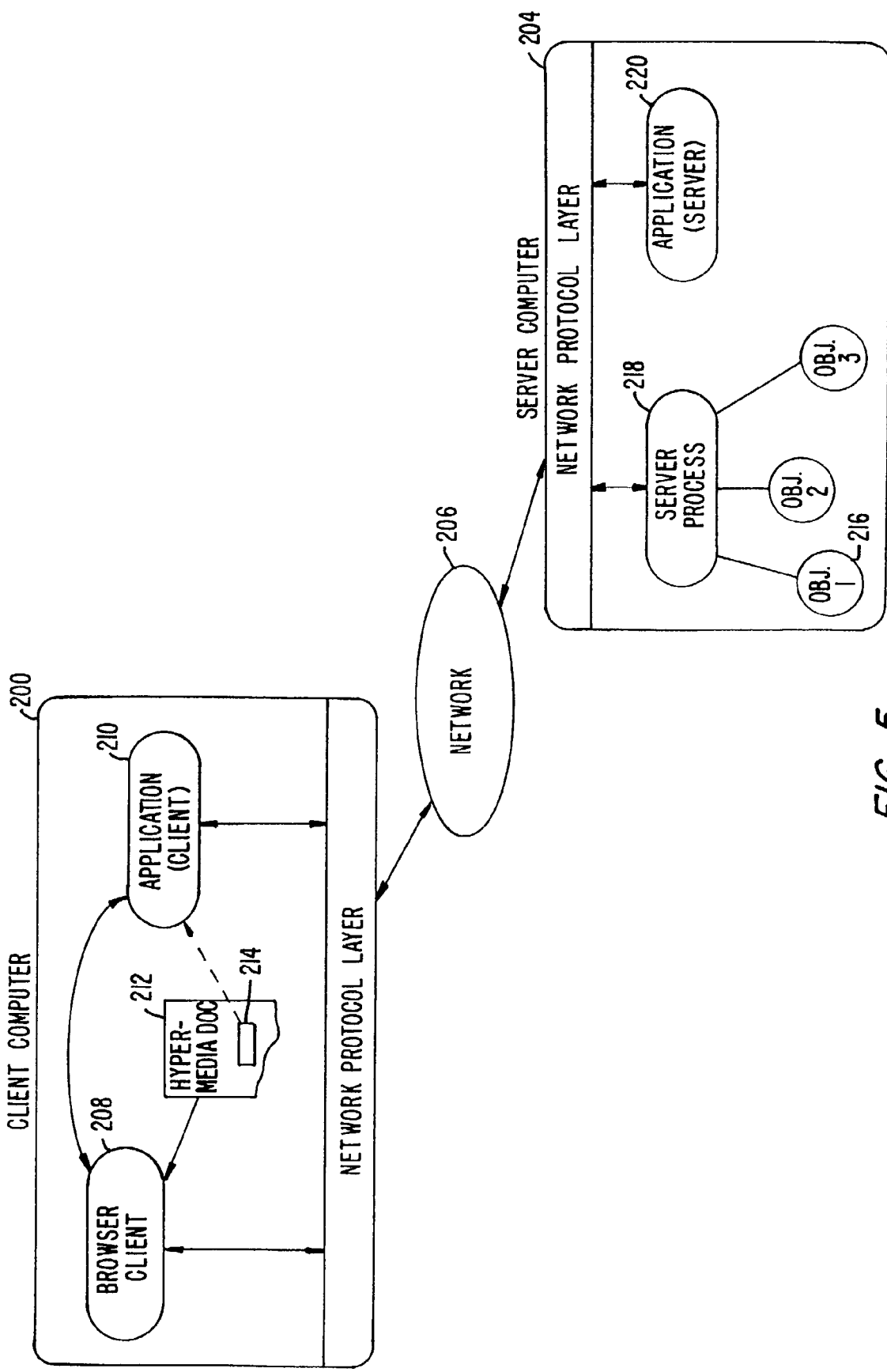
FIG. 5 is an illustration of an embodiment of the invention using a client computer, server computer and a network.

FIG. 5 is an illustration of an embodiment of the invention using a client computer, server computer and a network.

In FIG. 5, client computer 200 communicates with server computer 204 via network 206. Both client computer 200 and server computer 204 use a network protocol layer to communicate with network 206. In a preferred embodiment, network 206 is the Internet and the network protocol layers are TCP/IP. Other networks and network protocols may be used. For ease of illustration, additional hardware and software layers are not shown in FIG. 5.

Client computer 200 includes processes, such as browser client 208 and application client 210. In a preferred embodiment, application client 210 is resident within client computer 200 prior to browser client 208's parsing of a hypermedia document as discussed below. In a preferred embodiment application client 210 resides on the hard disk or RAM of client computer 200 and is loaded (if necessary) and executed when browser client 208 detects a link to application client 210. The preferred embodiment uses the XEvent interprocess communication protocol to exchange information between browser client 208 and application client 210 as described in more detail, below. Another possibility is to install application client 210 as a "terminate and stay resident" (TSR) program in an operating system environment, such as X-Window. Thereby making access to application client 210 much faster.

Browser client 208 is a process that a user of client computer 200 invokes in order to access various data objects, such as hypermedia documents, on network 206. Hypermedia document 212 shown within client computer 200 is an example of a hypermedia document, or object, that a user has requested access to. In this example, hypermedia document 212 has been retrieved from a server connected to network 206 and has been loaded into, e.g., client computer 200's RAM or other storage device.

Once hypermedia document 212 has been loaded into client computer 200, browser client 208 parses hypermedia document 212. In parsing hypermedia document 212, browser client 208 detects links to data objects as discussed above in the Background of the Invention section. In FIG. 5, hypermedia document 212 includes an embedded program link at 214. Embedded program link 214 identifies application client 212 as an application to invoke. In this present example, the application, namely, application client 210, resides on the same computer as the browser client 208 that the user is executing to view the hypermedia document. Embedded program link 214 may include additional information, such as parameters, that tell application client 210 how to proceed. For example, embedded program link 214 may include a specification as to a data object that application client 210 is to retrieve and process.

When browser client 208 encounters embedded program link 214, it invokes application client 210 (optionally, with parameters or other information) and application client 210 executes instructions to perform processing in accordance with the present invention.

An example of the type of processing that application client 210 may perform is multidimensional image visualization. Note that application client 210 is in communication with network 206 via the network protocol layer of client computer 200. This means that application client 210 can make requests over network 206 for data objects, such as multidimensional image objects. For example, application client 210 may request an object, such as object 1 at 216, located in server computer 204. Application client 210 may make the request by any suitable means. Assuming network 206 is the Internet, such a request would typically be made by using HTTP in response to a HTML-style link definition for embedded program link 214.

Assuming application client 210 has made a request for the data object at 216, server process 218 ultimately receives the request. Server process 218 then retrieves data object 216 and transfers it over network 206 back to application client 210. To continue with the example of a multidimensional visualization application, data object 216 may be a three dimensional view of medical data for, e.g., an embryo.

After application client 210 receives the multidimensional data object 216, application client 210 executes instructions to display the multidimensional embryo data on the display screen to a user of the client computer 200. The user is then able to interactively operate controls to recompute different views for the image data. In a preferred embodiment, a control window is displayed within, or adjacent to, a window generated by browser client 208 that contains a display of hypermedia document 212. An example of such display is discussed below in connection with FIG. 9. Thus, the user is able to interactively manipulate a multidimensional image object by means of the present invention. In order to make application client 210 integral with displays created by browser client 208, both the browser client and the application client must be in communication with each other, as shown by the arrow connecting the two within client computer 200. The manner of communication is through an application program interface (API), discussed below.

Browser client 208 is a process, such as NCSA Mosaic, Cello, etc. Application client 210 is embodied in software presently under development called "VIS" and "Panel" created by the Center for Knowledge Management at the University of California, San Francisco, as part of the Doyle Group's distributed hypermedia object embedding approach described in "Integrated Control of Distributed Volume Visualization Through the World-Wide-Web," by C. Ang, D. Martin, M. Doyle; to be published in the Proceedings of Visualization 1994, IEEE Press, Washington, D.C., October 1994.

Versions and descriptions of software embodying the present invention are generally available as hyperlinked data objects from the Visible Embryo Project's World Wide Web document at the URL address "HTTP://visembryo.ucsf.edu/".

Another embodiment of the present invention uses an application server process executing on server computer 204 to assist in processing that may need to be performed by an external program. For example, in FIG. 5, application server 220 resides on server computer 204. Application server 220 works in communication with application client 210 residing on client computer 200. In a preferred embodiment, application server 220 is called VRServer, also a part of Doyle Group's approach. Since server computer 204 is typically a larger computer having more data processing capabilities and larger storage capacity, application server 220 can operate more efficiently, and much faster, than application client 210 in executing complicated and numerous instructions.

In the present example where a multidimensional image object representing medical data for an embryo is being viewed, application server 220 could perform much of the viewing transformation and volume rendering calculations to allow a user to interactively view the embryo data at their client computer display screen. In a preferred embodiment, application client 210 receives signals from a user input device at the user's client computer 200. An example of such input would be to rotate the embryo image from a current position to a new position from the user's point of view. This information is received by application client 210 and processed to generate a command sent over network 206 to application server 220. Once application server 220 receives the information in the form of, e.g., a coordinate transformation for a new viewing position, application server 220 performs the mathematical calculations to compute a new view for the embryo image. Once the new view has been computed, the image data for the new view is sent over network 206 to application client 210 so that application client 210 can update the viewing window currently displaying the embryo image. In a preferred embodiment, application server 220 computes a frame buffer of raster display data, e.g., pixel values, and transfers this frame buffer to application client 210. Techniques, such as data compression and delta encoding, can be used to compress the data before transmitting over network 206 to reduce the bandwidth requirement.

It will be readily seen that application server 220 can advantageously use server computer 204's computing resources to perform the viewing transformation much more quickly than could application client 210 executing on client computer 200. Further, by only transmitting the updated frame buffer containing a new view for the embryo image, the amount of data sent over network 206 is reduced. By using appropriate compression techniques, such as, e.g., MPEG (Motion Picture Experts Group) or JPEG (Joint Photographic Experts Group), efficient use of network 206 is preserved.

Figure 6:
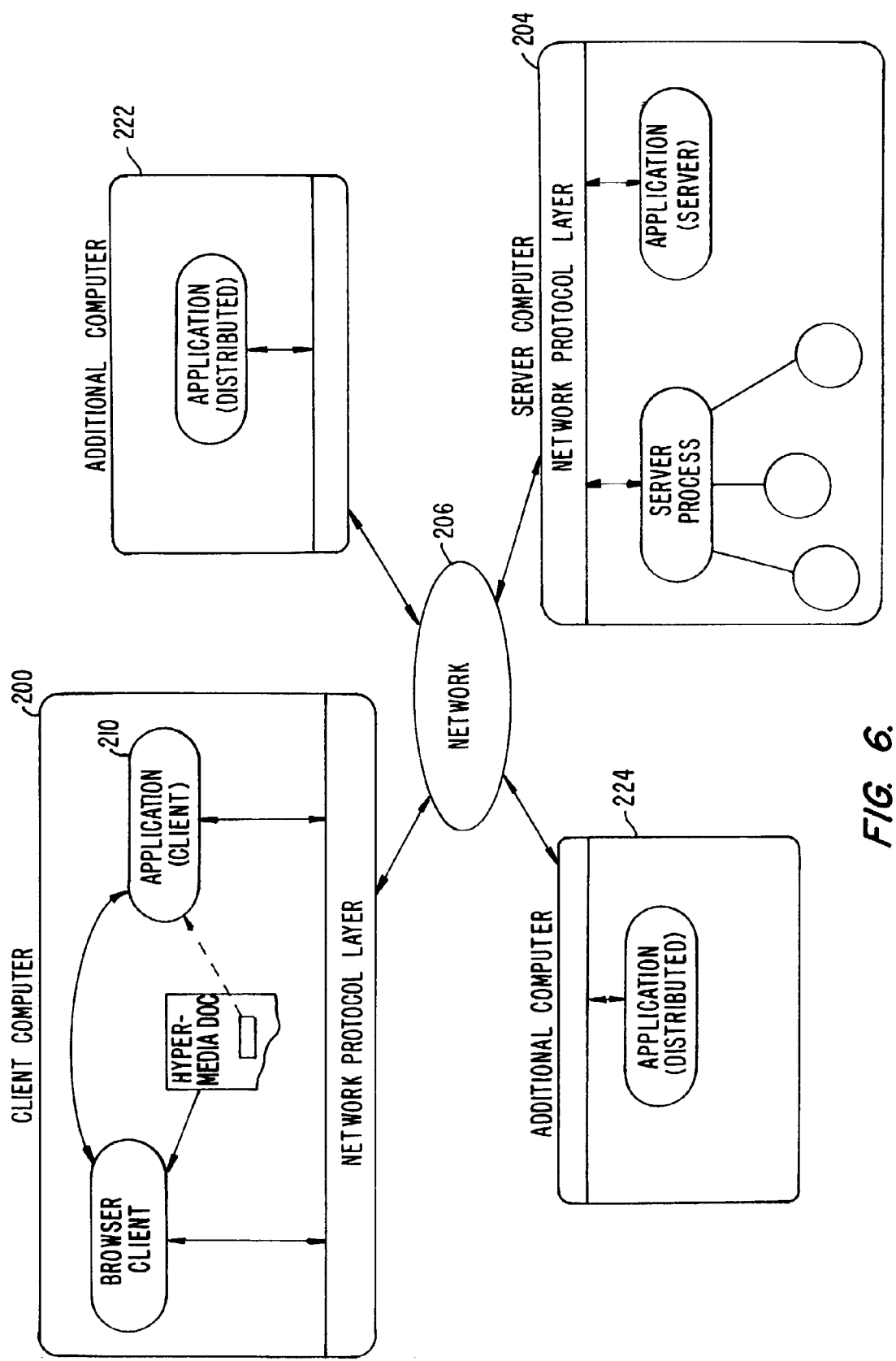
FIG. 6 shows another embodiment of the present invention using additional computers on the network.

FIG. 6 shows yet another embodiment of the present invention. FIG. 6 is similar to FIG. 5, except that additional computers 222 and 224 are illustrated. Each additional computer includes a process labeled "Application (Distributed)." The distributed application performs a portion of the task that an application, such as application server 220 or application client 210, perform. In the present example, tasks such as volume rendering may be broken up and easily performed among two or more computers. These computers can be remote from each other on network 206. Thus, several computers, such as server computer 204 and additional computers 222 and 224 can all work together to perform the task of computing a new viewpoint and frame buffer for the embryo for the new orientation of the embryo image in the present example. The coordination of the distributed processing can be performed at client computer 200 by application client 210, at server computer 204 by application server 220, or by any of the distributed applications executing on additional computers, such as 222 and 224. In a preferred embodiment, distributed processing is coordinated by a program called "VIS" represented by application client 210 in FIG. 6.

Other applications of the invention are possible. For example, the user can operate a spreadsheet program that is being executed by one or more other computer systems connected via the network to the user's client computer. Once the spreadsheet program has calculated results, those results may be sent over the network to the user's client computer for display within the hypermedia document on the user's client computer. In this way, computer systems located remotely on the network can be used to provide the computing power that may be required for certain tasks and to reduce the data bandwidth required by only transmitting results of the computations.

Another type of possible application of this invention would involve embedding a program which runs only on the client machine, but which provides the user with more functionality than exists in the hypermedia browser alone. An example of this is an embedded client application which is capable of viewing and interacting with images which have been processed with Dr. Doyle's MetaMAP invention (U.S. Pat. No. 4,847,604). This MetaMAP process uses object-oriented color map processing to allow individual color index ranges within paletted images to have object identities, and is useful for the creation of, for example, interactive picture atlases. It is a more efficient means for defining irregular "hotspots" on images than the ISMAP function of the World Wide Web, which uses polygonal outlines to define objects in images. A MetaMAP-capable client-based image browser application can be embedded, together with an associated image, within a hypermedia document, allowing objects within the MetaMAP-processed image to have URL addresses associated with them. When a user clicks with a mouse upon an object within the MetaMAP-processed image, the MetaMAP client application relays the relevant URL back to the hypermedia browser application, which then retrieves the HTML file or hypermedia object which corresponds to that URL.

The various processes in the system of the present invention communicate through a custom API called Mosaic/External Application Program Interface MEAPI. The MEAPI set of predefined messages includes those shown in Table I.

TABLE I

| Message Function Message Name |
|---|
| Messages from server to client: |
| 1. Server Update Done XtNrefreshNotify |
| 2. Server Ready XtNpanelStartNotify |
| 3. Server Exiting XtNpanelExitNotify |

TABLE I-continued

| Message Function Message Name |
|---|
| Messages from client to server: |
| 4. Area Shown XtNmapNotify |
| 5. Area Hidden XtNunmapNotify |
| 6. Area Destroyed XtNexitNotify |

The messages in Table I are defined in the file protocol. sub.--lib.h in Appendix B. The functions of the MEAPI are provided in protocol. sub.--lib.c of Appendix B. Thus, by using MEAPI a server process communicates to a client application program to let the client application know when the server has finished updating information, such as an image frame buffer, or pixmap (Message 1); when the server is ready to start processing messages (Message 2) and when the server is exiting or stopping computation related to the server application program.

For client to server communications, MEAPI provides for the client informing the server when the image display window area is visible, when the area is hidden and when the area is destroyed. Such information allows the server to decide whether to allocate computing resources for, e.g., rendering and viewing transformation tasks where the server is running an application program to generate new views of a multi dimensional object. Source code for MEAPI fundamental functions such as handle.sub.--client.sub. --msg, register. sub.--client, register.sub.--client.sub.--msg.sub.--callback and send.sub. --client. sub.--msg may be found in protocol. sub.--lib.c as part of the source code in Appendix B. Next, a discussion of the software processes that perform parsing of a hypermedia document and launching of an application program is provided in connection with Table II and FIGS. 7A, 7B, 8A and 8B. Table II, below, shows an example of an HTML tag format used by the present invention to embed a link to an application program within a hypermedia document.

For client to server communications, MEAPI provides for the client informing the server when the image display window area is visible, when the area is hidden and when the area is destroyed. Such information allows the server to decide whether to allocate computing resources for, e.g., rendering and viewing transformation tasks where the server is running an application program to generate new views of a multi dimensional object. Source code for MEAPI fundamental functions such as handle.sub.--client.sub. --msg, register. sub.--client, register.sub.--client.sub.--msg.sub.--callback and send.sub. client. sub.--msg may be found in protocol. sub.--lib.c as part of the source code in Appendix B.

Next, a discussion of the software processes that perform parsing of a hypermedia document and launching of an application program is provided in connection with Table II and FIGS. 7A, 7B, 8A and 8B.

Table II, below, shows an example of an HTML tag format used by the present invention to embed a link to an application program within a hypermedia document.

TABLE II

| |
|---|
| < EMBED |
| TYPE = "type" |
| HREF = "href" |
| WIDTH = width |
| HEIGHT = height |
| > |

As shown in Table II, the EMBED tag includes TYPE, HREF, WIDTH and HEIGHT elements. The TYPE element is a Multipurpose Internet Mail Extensions (MIME) type. Examples of values for the TYPE element are "application/x-vis" or "video/mpeg". The type "application/x-vis" indicates that an application named "x-vis" is to be used to handle the object at the URL specified by the HREF. Other types are possible such as "application/x-inventor", "application/postscript" etc. In the case where TYPE is "application/x-vis" this means that the object at the URL address is a three dimensional image object since the program "x-vis" is a data visualization tool designed to operate on three dimensional image objects. However, any manner of application program may be specified by the TYPE element so that other types of applications, such as a spreadsheet program, database program, word processor, etc. may be used with the present invention. Accordingly, the object reference by the HREF element would be, respectively; a spreadsheet object, database object, word processor document object, etc.

On the other hand, TYPE values such as "video/mpeg", "image/gif", "video/x-sgi-movie", etc. describe the type of data that HREF specifies. This is useful where an external application program, such as a video player, needs to know what format the data is in, or where the browser client needs to determine which application to launch based on the data format. Thus, the TYPE value can specify either an application program or a data type. Other TYPE values are possible. HREF specifies a URL address as discussed above for a data object. Where TYPE is "application/x-vis" the URL address specifies a multi-dimensional image object. Where TYPE is "video/mpeg" the URL address specifies a video object.

WIDTH and HEIGHT elements specify the width and height dimensions, respectively, of a Distributed Hypermedia Object Embedding (DHOE) window to display an external application object such as the three dimensional image object or video object discussed above.

Figure 7A:
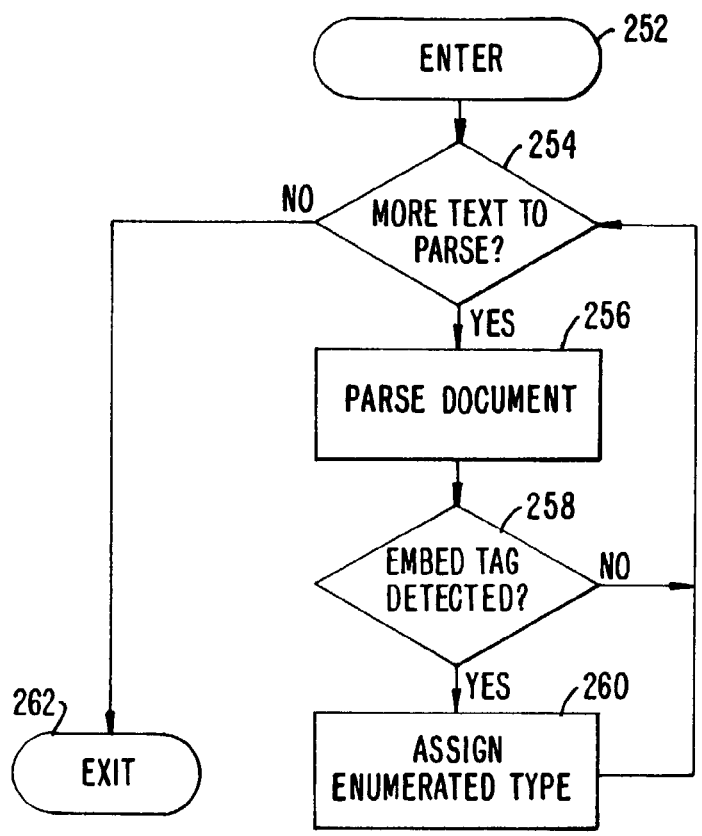
FIG. 7A is a flowchart of some of the functionality within the HTMLparse.c file.

FIG. 7A is a flowchart describing some of the functionality within the HTMLparse.c file of routines. The routines in HTMLparse.c perform the task of parsing a hypermedia document and detecting the EMBED tag. In a preferred embodiment, the enhancements to include the EMBED tag are made to an HTML library included in public domain NCSA Mosaic version 2.4. Note that much of the source code in is pre-existing NCSA Mosaic code. Only those portions of the source code that relate to the new functionality discussed in this specification should be considered as part of the invention. The new functionality is identifiable as being set off from the main body of source code by conditional compilation macros such as "#ifdef . . . #endif" as will be readily apparent to one of skill in the art.

Figure 1:
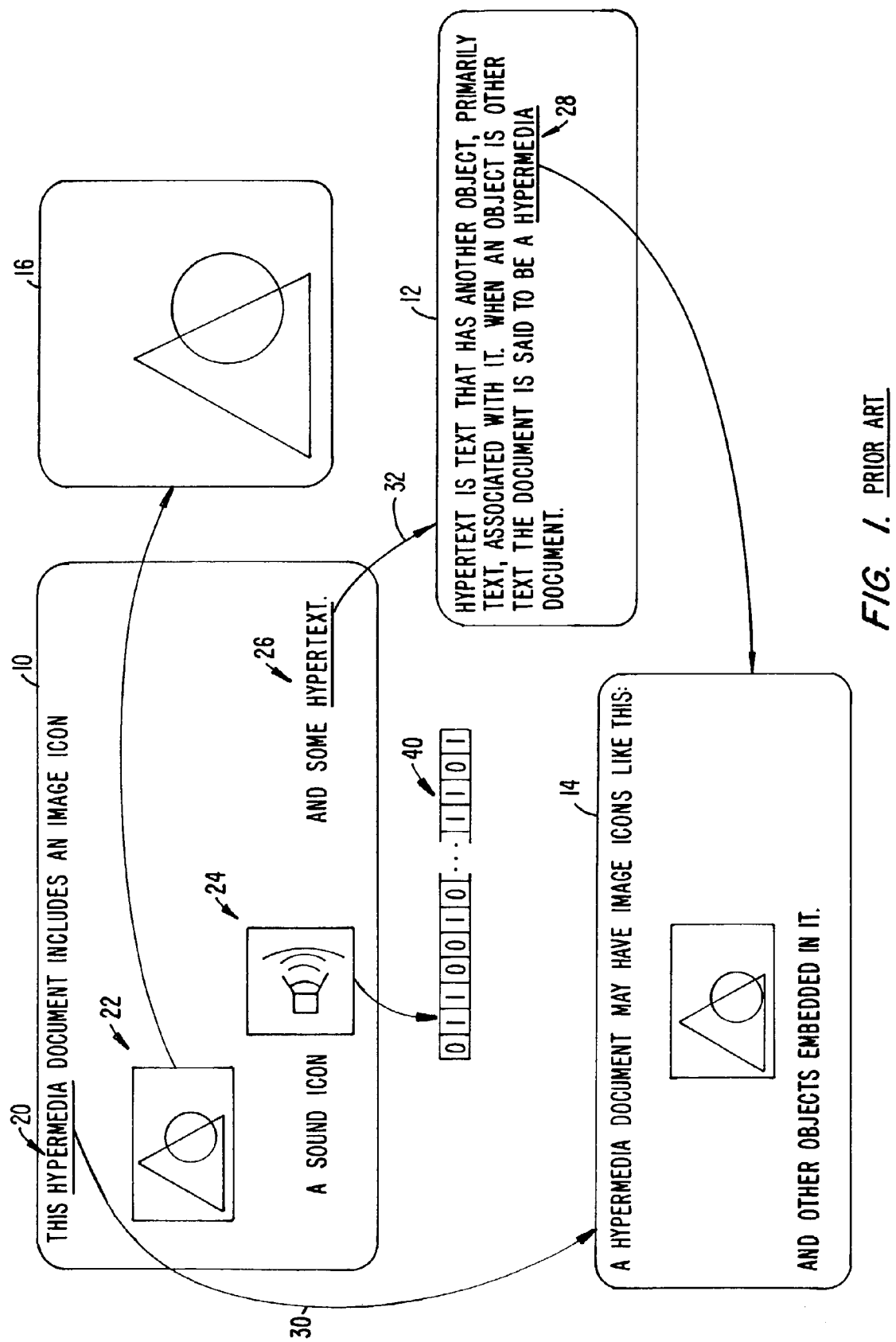
FIG. 1 illustrates examples of hypertext and hypermedia documents and links.
Figure 2:
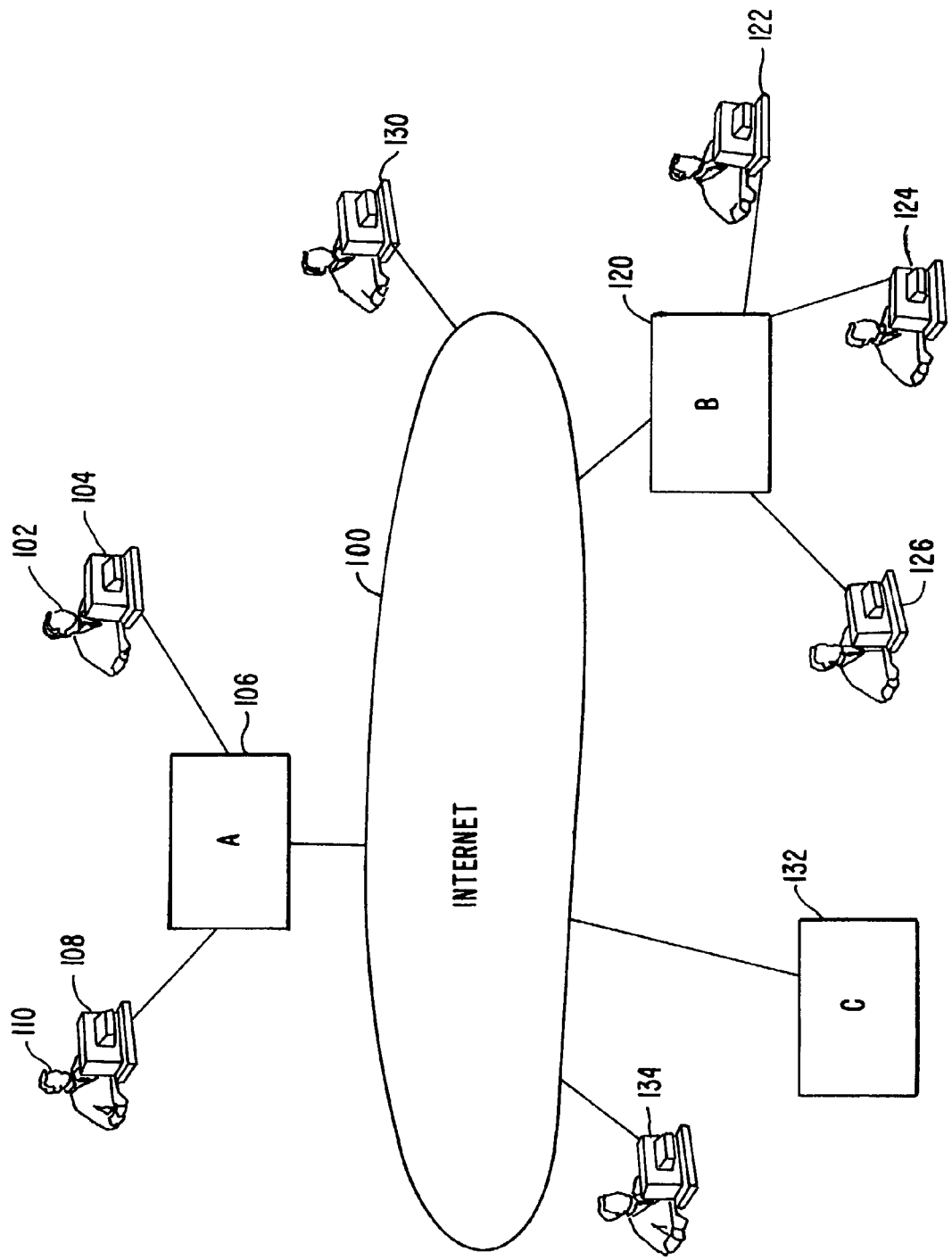
FIG. 2 is an example of a computer network.

In general, the flowcharts in this specification illustrate one or more software routines executing in a computer system such as computer system 1 of FIG. 1. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention.

Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart may be referred to as if implemented in a single "routine".

The modifications to NCSA Mosaic version 2.4 software files HTMLparse.c, HTMLformat.c, HTMLwidget.c and HTML.c will next be discussed, in turn.

Returning to FIG. 7, it is assumed that a hypermedia document has been obtained at a user's client computer and that a browser program executing on the client computer displays the document and calls a first routine in the HTMLparse.c file called "HTMLparse". This first routine, HTMLparse, is entered at step 252 where a pointer to the start of the document portion is passed. Steps 254, 256 and 258 represent a loop where the document is parsed or scanned for HTML tags or other symbols. While the file HTMLparse.c includes routines to handle all possible tags and symbols that may be encountered, FIG. 7A, for simplicity, only illustrates the handling of EMBED tags.

Assuming there is more text to parse, execution proceeds to step 256 where routines in HTMLparse.c obtain the next item (e.g., word, tag or symbol) from the document. At step 258 a check is made as to whether the current tag is the EMBED tag. If not, execution returns to step 254 where the next tag in the document is obtained. If, at step 258, it is determined that the tag is the EMBED tag, execution proceeds to step 260 where an enumerated type is assigned for the tag. Each occurrence of a valid EMBED tag specifies an embedded object. HTMLParse calls a routine "get.sub.--mark" in HTMLparse.c to put sections of HTML document text into a "markup" text data structure. Routine get.sub. ---mark, in turn, calls ParseMarkType to assign an enumerated type. The enumerated type is an identifier with a unique integer associated with it that is used in later processing described below.

Once all of the hypermedia text in the text portion to be displayed has been parsed, execution of HTMLparse.c routines terminates at step 262.

Figure 7B:
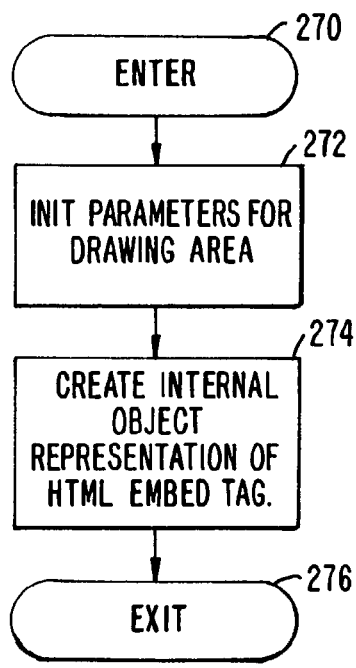
FIG. 7B is a flowchart of some of the functionality within the HTMLformat.c file.

FIG. 7B is a flowchart of routines in file HTMLformat.c to process the enumerated type created for the EMBED tag by routines in HTMLparse.c. In the X-Window implementation of a preferred embodiment, the enumerated type is processed as if it is a regular Motif/XT widget. For details on X-Window development see, e.g., "Xlib Programming Manual," "X Toolkit Intrinsics Programming Manual" and "Motif Programming Manual" published by O'Reilly & Associates, Inc. HTMLformat is entered at step 270 where a pointer to the enumerated type to process is passed.

At step 272 the parameters of the structure are initialized in preparation for inserting a DrawingArea widget on an HTML page. This includes providing values for the width and height of a window on the display to contain an image, position of the window, style, URL of the image object, etc. Various codes are also added by routines in HTMLformat.c (such as TriggerMarkChanges) to insert an internal representation of the HTML statement into an object list maintained internally by the browser. In the X-Window application corresponding to the source code of Appendix A, the browser is NCSA Mosaic version 2.4.

Figure 8A:
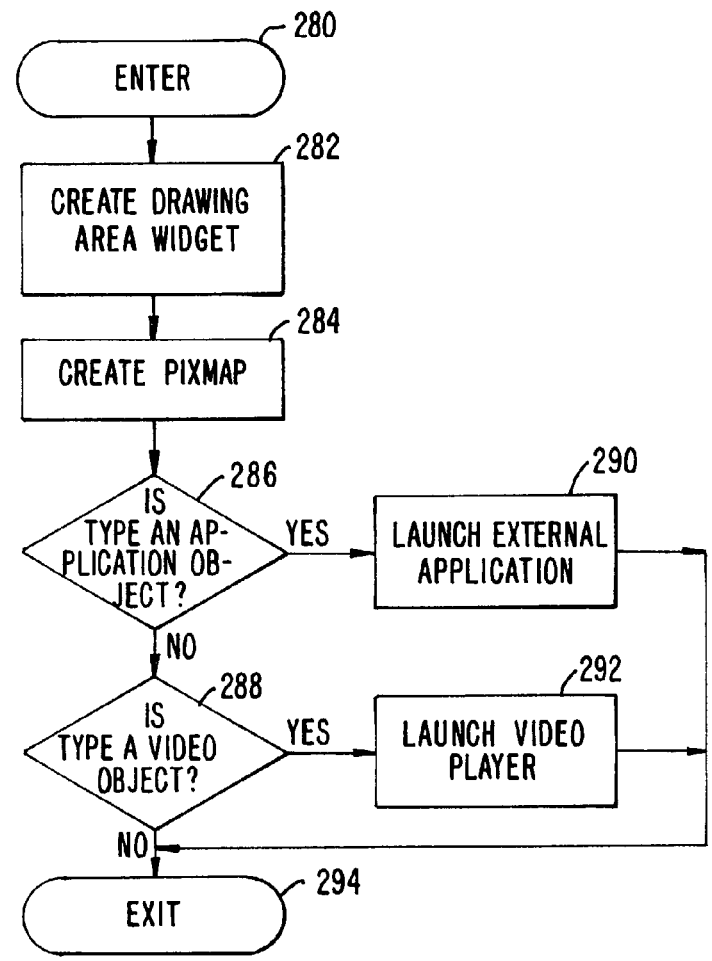
FIG. 8A is a flowchart of some of the functionality within the HTMLwidget.c file.

FIG. 8A is a flowchart for routine HTMLwidget. HTMLwidget creates display data structures and launches an external application program to handle the data object specified by the URL in the EMBED tag.

HTMLwidget is entered at step 280 after HTMLformat has created the internal object representation of the EMBED tag. HTMLwidget is passed the internal object and performs its processing on the object. At step 282 the DrawingArea widget is created according to the type of the internal representation, from HTMLformat, specified in the internal object. Similarly, at step 284 a pixmap area for backing storage is defined.

At step 286 a check is made as to whether the type attribute of the object, i.e., the value for the TYPE element of the EMBED tag, is an application. If so, step 290 is executed to launch a predetermined application. In a preferred embodiment an application is launched according to a user-defined list of application type/application pairs. The list is defined as a user-configurable XResource as described in "Xlib Programming Manual." An alternative embodiment could use the MIME database as the source of the list of application type/application pairs. The routine "vis.sub.--start.sub.--external. sub. --application" in file HTMLformat.c is invoked to match the application type and to identify the application to launch.

The external application is started as a child process of the current running process (Mosaic), and informed about the window ID of the DrawingArea created in HTMLformat. The external application is also passed information about the ID of the pixmap, the data URL and dimensions. Codes for communication such as popping-up/iconifying, start notification, quit notification and refresh notification with external applications and DrawingArea refreshing are also added. Examples of such codes are (1) "setup/start" in vis.sub.--register.sub.--client and vis. sub.--get panel.sub.--window in HTMLwidgets.c; (2) "handle messages from external applications" in vis.sub.--handle panel.sub.--msg in HTMLwidgets.c; (3) "send messages to external applications" in vis. sub.—send.sub.--msg in HTMLwidgets.c; (4) "terminate external applications" in vis.sub.--exit in HTMLwidgets.c which calls vis.sub.--send.sub.--msg to send a quit message; and (5) "respond to refresh msgs" in vis.sub.--redraw in HTMLwidgets.c.

If, at step 286, the type is determined not to be an application object (e.g., a three dimensional image object in the case of application "x-vis") a check is made at step 288 to determine if the type is a video object. If so, step 292 is executed to launch a video player application. Parameters are passed to the video player application to allow the player to display the video object within the DrawingArea within the display of the portion of hypermedia document on the client's computer. Note that many other application objects types are possible as described above.

Figure 8B:
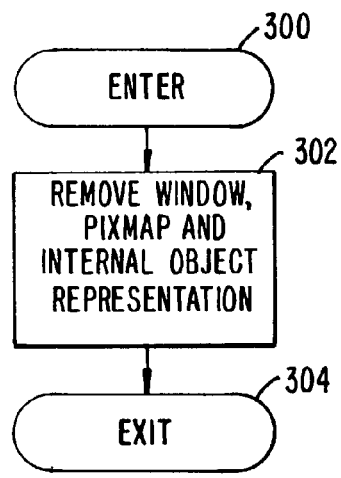
FIG. 8B is a flowchart of some of the functionality within the HTML.c file.

FIG. 8B is a flowchart for routine HTML. Routine HTML takes care of "shutting down" the objects, data areas, etc. that were set up to launch the external application and display the data object. HTML is entered at step 300 and is called when the display or other processing of the EMBED tag has been completed. At step 302 the display window is removed and the memory areas for the pixmap and internal object structure is made free for other uses. Completion of processing can be by user command or by computer control.

The present invention allows a user to have interactive control over application objects such as three dimensional image objects and video objects. In a preferred embodiment, controls are provided on the external applications' user interface. In the case of a VIS/panel application, a process, "panel" creates a graphical user interface (GUI) thru which the user interacts with the data. The application program, VIS, can be executing locally with the user's computer or remotely on a server, or on one or more different computers, on the network. The application program updates pixmap data and transfers the pixmap data (frame image data) to a buffer to which the browser has access. The browser only needs to respond to the refresh request to copy the contents from the updated pixmap to the DrawingArea. The Panel process sends messages as "Msg" sending performed by routines such as vis.sub.--send. sub.--msg and vis.sub.--handle panel.sub.--msg to send events (mousemove, keypress, etc.) to the external application.

Figure 9:
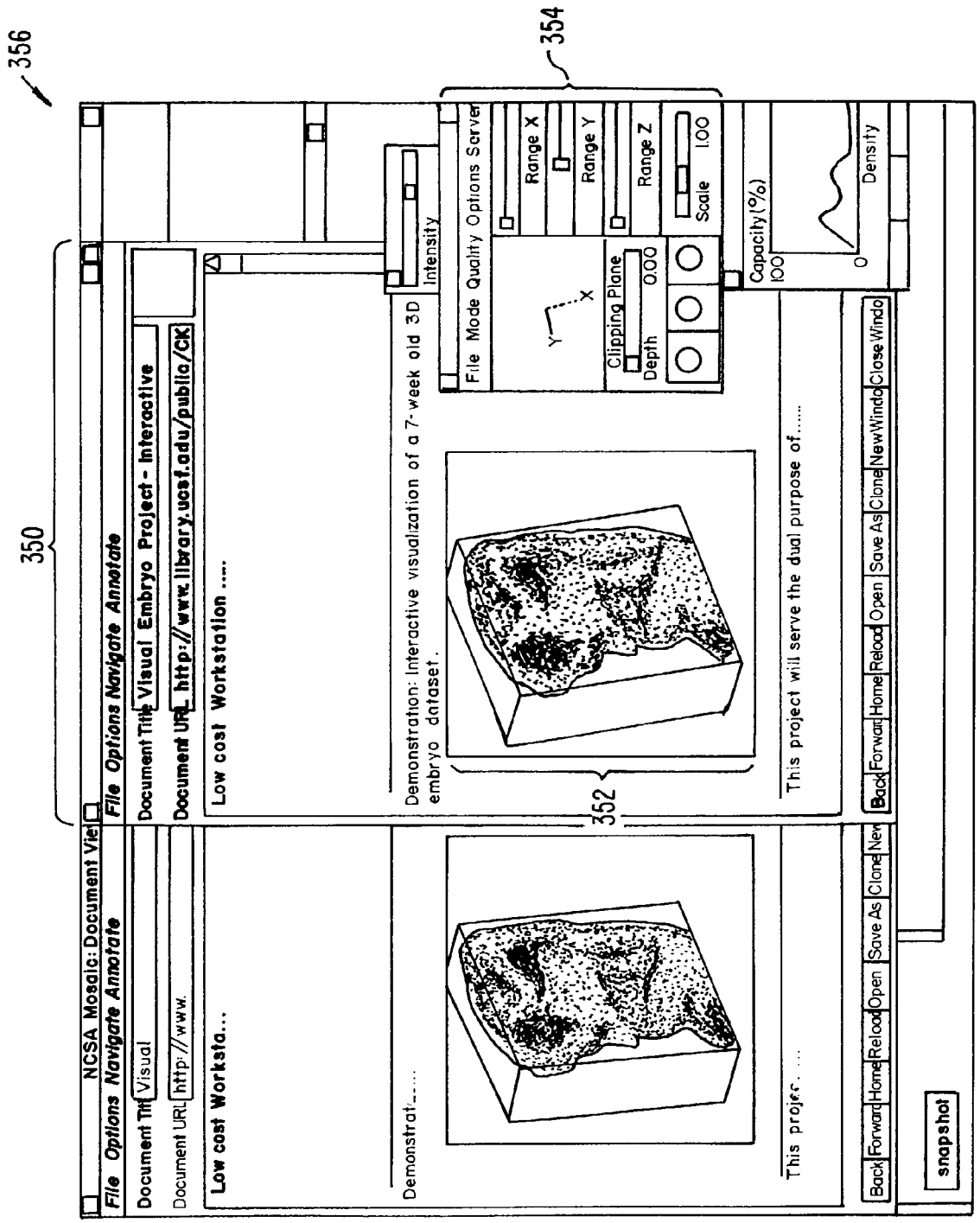
FIG. 9 is a screen display generated in accordance with the present invention.

FIG. 9 is a screen display of the invention showing an interactive application object (in this case a three dimensional image object) in a window within a browser window. In FIG. 9, the browser is NCSA Mosaic version 2.4. The processes VIS, Panel and VRServer work as discussed above. FIG. 9 shows screen display 356 Mosaic window 350 containing image window 352 and a portion of a panel window 354. Note that image window 352 is within Mosaic window 350 while panel window 354 is external to Mosaic window 350. Another possibility is to have panel window 354 within Mosaic window 350. By using the controls in panel window 354 the user is able to manipulate the image within image window 352 in real time do perform such operations as scaling, rotation, translation, color map selection, etc. In FIG. 9, two Mosaic windows are being used to show two different views of an embryo image. One of the views is rotated by six degrees from the other view so that a stereoscopic effect can be achieved when viewing the images. Communication between Panel and VIS is via "Tooltalk" described in, e.g., "Tooltalk 1.1.1 Reference Manual," from SunSoft.

Figure 10:
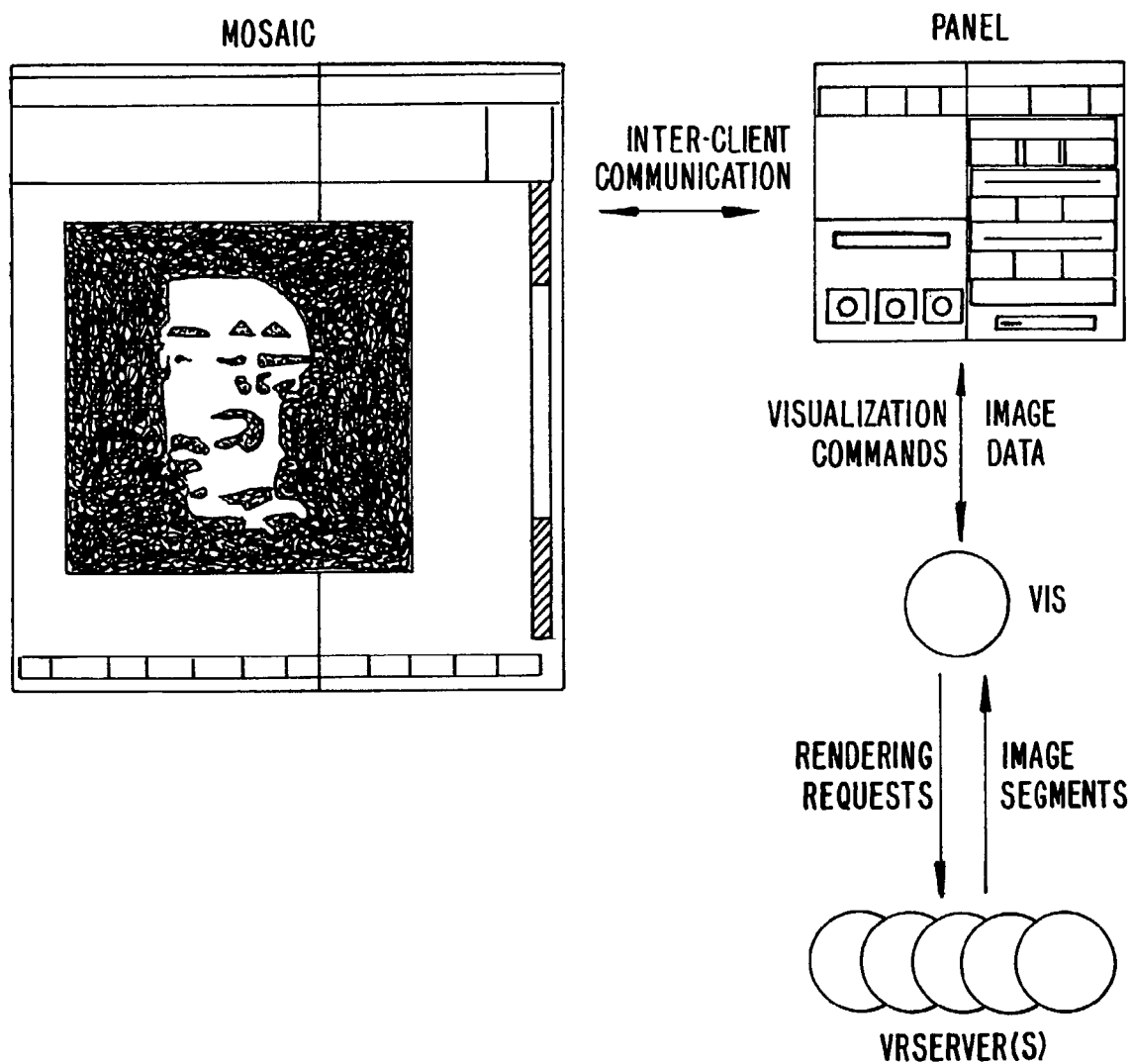
FIG. 10 is a diagram of the various processes and data paths in the present invention.

FIG. 10 is an illustration of the processes VIS, Panel and VRServer discussed above. As shown in FIG. 10, the browser process, Mosaic, communicates with the Panel process via inter-client communication mechanisms such as provided in the X-Window environment. The Panel process communicates with the VIS process through a communications protocol (ToolTalk, in the preferred embodiment) to exchange visualization command messages and image data. The image data is computed by one or more copies of a process called VRServer that may be executing on remote computers on the network. VRServer processes respond to requests such as rendering requests to generate image segments. The image segments are sent to VIS and combined into a pixmap, or frame image, by VIS. The frame image is then transferred to the Mosaic screen via communications between VIS, Panel and Mosaic. A further description of the data transfer may be found in the paper "Integrated Control of Distributed Volume Visualization Through the World-Wide-Web," referenced above.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for running an application program in a distributed hypermedia network environment, wherein the network environment comprises at least one client workstation and one network server coupled to the network environment, the method comprising:

receiving, at the client workstation from the network server over the network environment, at least one file containing information to enable a browser application to display at least a portion of a distributed hypermedia document within a browser-controlled window;

executing the browser application on the client workstation, with the browser application:

responding to text formats to initiate processing specified by the text formats;

displaying at least a portion of the document within the browser-controlled window;

identifying an embed text format which corresponds to a first location in the document, where the embed text format specifies the location of at least a portion of an object external to the file, where the object has type information associated with it;

utilizing the type information to identify and locate an executable application external to the file; and automatically invoking the executable application, in response to the identifying of the embed text format, to execute on the client workstation in order to display the object and enable an end-user to directly interact with the object while the object is being displayed within a display area created at the first location within the portion of the hypermedia document being displayed in the browser-controlled window.

2. The method of claim 1 where:
the information to enable comprises text formats.

3. The method of claim 2 where the text formats are HTML tags.

4. The method of claim 1 where the information contained in the file received comprises at least one embed text format.

5. The method of claim 1 where the step of identifying an embed text format comprises:

parsing the received file to identify text formats included in the received file.

6. The method of claim 5 where the parsing is by a parser in the browser.

7. The method of claim 1 where the processing specified by the text formats is specified directly.

8. The method of claim 1 where the correspondence is implied by the order of the text format in a set of all of the text formats.

9. The method of claim 1 where the embed text format specifies the location of at least a portion of an object directly.

10. The method of claim 1 where having type information associated is by including type information in the embed text format.

11. The method of claim 1 where automatically invoking does not require interactive action by the user.

12. The method of claim 1, wherein said executable application is a controllable application and further comprising the step of:

interactively controlling said controllable application on said client workstation via inter-process communications between said browser and said controllable application.

13. The method of claim 12, wherein the communications to interactively control said controllable application continue to be exchanged between the controllable application and the browser even after the controllable application program has been launched.

14. The method of claim 13, wherein additional instructions for controlling said controllable application reside on said network server, wherein said step of interactively controlling said controllable application includes the following substeps:

issuing, from the client workstation, one or more commands to the network server;

executing, on the network server, one or more instructions in response to said commands;

sending information from said network server to said client workstation in response to said executed instructions; and processing said information at the client workstation to interactively control said controllable application.

15. The method of claim 14, wherein said additional instructions for controlling said controllable application reside on said client workstation.

16. One or more computer readable media encoded with software comprising computer executable instructions, for use in a distributed hypermedia network environment, wherein the network environment comprises at least one client workstation and one network server coupled to the network environment, and when the software is executed operable to:

receive, at the client workstation from the network server over the network environment, at least one file containing information to enable a browser application to display at least a portion of a distributed hypermedia document within a browser-controlled window;

cause the client workstation to utilize the browser to:

respond to text formats to initiate processing specified by the text formats;

display at least a portion of the document within the browser-controlled window;

identify an embed text format corresponding to a first location in the document, the embed text format specifying the location of at least a portion of an object external to the file, with the object having type information associated with it;

utilize the type information to identify and locate an executable application external to the file; and automatically invoke the executable application, in response to the identifying of the embed text format, to execute on the client workstation in order to display the object and enable an end-user to directly interact with the object while the object is being displayed within a display area created at the first location within the portion of the hypermedia document being displayed in the browser-controlled window.

17. The computer readable media of claim 16 where:
the information to enable comprises text formats.

18. The computer readable media of claim 17 where:
the text formats are HTML tags.

19. The computer readable media of claim 16 where:
the information contained in the file received comprises at least one embed text format.

20. A method of serving digital information in a computer network environment having a network server coupled the network environment, and where the network environment is a distributed hypermedia environment, the method comprising:

communicating via the network server with at least one client workstation over said network in order to cause said client workstation to:

receive, over said network environment from said server, at least one file containing information to enable a browser application to display at least a portion of a distributed hypermedia document within a browser-controlled window;

execute, at said client workstation, a browser application, with the browser application:

responding to text formats to initiate processing specified by the text formats;

displaying, on said client workstation, at least a portion of the document within the browser-controlled window;

identifying an embed text format which corresponds to a first location in the document, where the embed text format specifies the location of at least a portion of an object external to the file, where the object has type information associated with it;

utilizing the type information to identify and locate an executable application external to the file; and automatically invoking the executable application, in response to the identifying of the embed text format, to execute on the client workstation in order to display the object and enable an end-user to directly interact with the object while the object is being displayed within a display area created at the first location within the portion of the hypermedia document being displayed in the browser-controlled window.

21. The method of claim 20 where:
the information to enable comprises text formats.

22. The method of claim 21 where:
the text formats are HTML tags.

23. The method of claim 20 where:
the information contained in the file received comprises at least one embed text format.

24. A method for running an executable application in a computer network environment, wherein said network environment has at least one client workstation and one network server coupled to a network environment, the method comprising:

enabling an end-user to directly interact with an object by utilizing said executable application to interactively process said object while the object is being displayed within a display area created at a first location within a portion of a hypermedia document being displayed in a browser-controlled window, wherein said network environment is a distributed hypermedia environment, wherein said client workstation receives, over said network environment from said server, at least one file containing information to enable said browser application to display, on said client workstation, at least said portion of said distributed hypermedia document within said browser-controlled window, wherein said executable application is external to said file, wherein said client workstation executes the browser application, with the browser application responding to text formats to initiate processing specified by the text formats, wherein at least said portion of the document is displayed within the browser-controlled window, wherein an embed text format which corresponds to said first location in the document is identified by the browser, wherein the embed text format specifies the location of at least a portion of said object external to the file, wherein the object has type information associated with it, wherein the type information is utilized by the browser to identify and locate said executable application, and wherein the executable application is automatically invoked by the browser, in response to the identifying of the embed text format.

25. The method of claim 24 where:
the information to enable comprises text formats.

26. The method of claim 25 where:
the text formats are HTML tags.

27. The method of claim 24 where:
the information contained in the file received comprises at least one embed text format.

28. One or more computer readable media encoded with software comprising an executable application for use in a system having at least one client workstation and one network server coupled to a network environment, operable to:

cause the client workstation to display an object and enable an end-user to directly interact with said object while the object is being displayed within a display area created at a first location within a portion of a hypermedia document being displayed in a browser-controlled window, wherein said network environment is a distributed hypermedia environment, wherein said client workstation receives, over said network environment from said server, at least one file containing information to enable said browser application to display, on said client workstation, at least said portion of said distributed hypermedia document within said browser-controlled window, wherein said executable application is external to said file, wherein said client workstation executes said browser application, with the browser application responding to text formats to initiate processing specified by the text formats, wherein at least said portion of the document is displayed within the browser-controlled window, wherein an embed text format which corresponds to said first location in the document is identified by the browser, wherein the embed text format specifies the location of at least a portion of said object external to the file, wherein the object has type information associated with it, wherein the type information is utilized by the browser to identify and locate said executable application, and wherein the executable application is automatically invoked by the browser, in response to the identifying of the embed text format.

29. The method of claim 28 where:
the information to enable comprises text formats.

30. The method of claim 29 where:
the text formats are HTML tags.

31. The method of claim 28 where:
the information contained in the file received comprises at least one embed text format.

32. A method for serving digital information in a computer network environment, said method comprising:

communicating via a network server with at least one client workstation over said computer network environment in order to cause said client workstation to:

receive at said client workstation, over said computer network environment from said server, at least one file containing information to enable a browser application to display, on said client workstation, at least a portion of a distributed hypermedia document within a browser-controlled window;

utilize an executable application external to said file to enable an end-user to directly interact with an object while the object is being displayed within a display area created at a first location within the portion of the distributed hypermedia document being displayed in the browser-controlled window, with said network server coupled to said computer network environment, wherein said computer network environment has at least said client workstation and said network server coupled to the computer network environment, wherein said computer network environment is a distributed hypermedia environment, wherein said client workstation executes the browser application, with the browser application responding to text formats to initiate processing specified by the text formats, wherein at least said portion of the document is displayed within the browser-controlled window, wherein an embed text format which corresponds to said first location in the document is identified by the browser, wherein the embed text format specifies the location of at least a portion of said object external to the file, wherein the object has type information associated with it, wherein the type information is utilized by the browser to identify and locate said executable application, and wherein the executable application is automatically invoked by the browser, in response to the identifying of the embed text format.

33. The method of claim 32 where:
the information to enable comprises text formats.

34. The method of claim 33 where:
the text formats are HTML tags.

35. The method of claim 32 where:
the information contained in the file received comprises at least one embed text format.

36. A method for running an application program in a distributed hypermedia network environment, wherein the distributed hypermedia network environment comprises at least one client workstation and one remote network server coupled to the distributed hypermedia network environment, the method comprising:
receiving, at the client workstation from the network server over the distributed hypermedia network environment, at least one file containing information to enable a browser application to display at least a portion of a distributed hypermedia document within a browser-controlled window;
executing the browser application on the client workstation, with the browser application:
responding to text formats to initiate processing specified by the text formats;
displaying at least a portion of the document within the browser-controlled window;
identifying an embed text format which corresponds to a first location in the document, where the embed text format specifies the location of at least a portion of an object;
identifying and locating an executable application associated with the object; and
automatically invoking the executable application, in response to the identifying of the embed text format, in order to enable an end-user to directly interact with the object, while the object is being displayed within a display area created at the first location within the portion of the hypermedia document being displayed in the browser-controlled window, wherein the executable application is part of a distributed application, and wherein at least a portion of the distributed application is for execution on a remote network server coupled to the distributed hypermedia network environment.

37. The method of claim 36 where:
the information to enable comprises text formats.

38. The method of claim 37 where:
the text formats are HTML tags.

39. The method of claim 36 where:
the information contained in the file received comprises at least one embed text format.

40. A method of serving digital information in a computer network environment having a network server coupled to said computer network environment, and where the network environment is a distributed hypermedia network environment, the method comprising:
communicating via the network server with at least one remote client workstation over said computer network environment in order to cause said client workstation to:
receive, over said computer network environment from the network server, at least one file containing information to enable a browser application to display at least a portion of a distributed hypermedia document within a browser-controlled window;
execute, at said client workstation, a browser application, with the browser application:
responding to text formats to initiate processing specified by the text formats;
displaying, on said client workstation, at least a portion of the document within the browser-controlled window;
identifying an embed text format which corresponds to a first location in the document, where the embed text format specifies the location of at least a portion of an object;
identifying and locating an executable application associated with the object; and
automatically invoking the executable application, in response to the identifying of the embed text format, in order to enable an end-user to directly interact with the object while the object is being displayed within a display area created at the first location within the portion of the hypermedia document being displayed in the browser-controlled window, wherein the executable application is part of a distributed application, and wherein at least a portion of the distributed application is for execution on the network server.

41. The method of claim 40 where:
the information to enable comprises text formats.

42. The method of claim 41 where:
the text formats are HTML tags.

43. The method of claim 40 where:
the information contained in the file received comprises at least one embed text format.

44. A method for serving digital information in a computer network environment, said method comprising:
communicating via a network server with at least a remote client workstation over the computer network environment in order to receive commands from the client workstation, with the network server coupled to said computer network environment, wherein said computer network environment has at least said client workstation and said network server coupled to the computer network environment, wherein the computer network environment is a distributed hypermedia environment, wherein the client workstation receives, over the computer network environment from the server, at least one file containing information to enable a browser application to display, on the client workstation, at least a portion of a distributed hypermedia document within a browser-controlled window, wherein the client workstation executes the browser application, with the browser application responding to text formats to initiate processing specified by the text formats, wherein at least said portion of the document is displayed within the browser-controlled window, wherein an embed text format which corresponds to a first location in the document is identified by the browser, wherein the embed text format specifies the location of at least a portion of an object, wherein an executable application associated with the object is identified and located by the browser, wherein the executable application is automatically invoked by the browser, in response to the identifying of the embed text format, to enable an end-user to directly interact with the object while the object is being displayed within a display area created at the first location within the portion of the hypermedia document being displayed in the browser-controlled window, wherein the executable application is part of a distributed application, and wherein at least a portion of the distributed application is for execution on the network server;

executing one or more instructions in response to the commands;

sending information to the client workstation in response to the executed instructions, to allow processing of the information at the client workstation to enable said end-user to directly interact with said object.

45. The method of claim 44 where:

the information to enable comprises text formats.

46. The method of claim 45 where:

the text formats are HTML tags.

47. The method of claim 44 where:

the information contained in the file received comprises at least one embed text format.

\* \* \* \* \*

UNITED STATES PATENT AND TRADEMARK OFFICE
CERTIFICATE OF CORRECTION

| | | |
|---|---|---|
| PATENT NO. | : 7,599,985 B2 | |
| APPLICATION NO. | : 10/217955 | |
| DATED | : October 6, 2009 | |
| INVENTOR(S) | : Michael Doyle, David Martin and Cheong Ang | |

It is certified that error appears in the above-identified patent and that said Letters Patent is hereby corrected as shown below:

Col. 20, in claim 29, line 1 "method" should be changed to --computer readable media--.
Col. 20, in claim 30, line 1 "method" should be changed to --computer readable media--.
Col. 20, in claim 31, line 1 "method" should be changed to --computer readable media--.

Signed and Sealed this
Fifth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,599,985 B2  
APPLICATION NO. : 10/217955  
DATED : October 6, 2009  
INVENTOR(S) : Michael Doyle, David Martin and Cheong Ang Page 1 of 1

It is certified that error appears in the above-identified patent and that said Letters Patent is hereby corrected as shown below:

Col. 20, line 33 (claim 29, line 1) "method" should be changed to --computer readable media--.
Col. 20, line 35 (claim 30, line 1) "method" should be changed to --computer readable media--.
Col. 20, line 37 (claim 31, line 1) "method" should be changed to --computer readable media--.

This certificate supersedes the Certificate of Correction issued April 5, 2011.

Signed and Sealed this
Third Day of May, 2011

David J. Kappos
*Director of the United States Patent and Trademark Office*